United States Patent
Wei et al.

(10) Patent No.: US 11,337,245 B2
(45) Date of Patent: May 17, 2022

(54) TDD RECONFIGURATION WITH CONSIDERATION OF DTX/DRX

(71) Applicants: QUALCOMM Incorporated, San Diego, CA (US); Chao Wei, Beijing (CN); Xipeng Zhu, Beijing (CN); Jilei Hou, Beijing (CN); Neng Wang, Beijing (CN)

(72) Inventors: Chao Wei, Beijing (CN); Xipeng Zhu, Beijing (CN); Jilei Hou, San Diego, CA (US); Neng Wang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 14/654,660

(22) PCT Filed: Jan. 27, 2014

(86) PCT No.: PCT/CN2014/071550
§ 371 (c)(1),
(2) Date: Jun. 22, 2015

(87) PCT Pub. No.: WO2014/117709
PCT Pub. Date: Aug. 7, 2014

(65) Prior Publication Data
US 2015/0327324 A1 Nov. 12, 2015

(30) Foreign Application Priority Data
Jan. 29, 2013 (WO) ............... PCT/CN2013/071076

(51) Int. Cl.
*H04W 74/00* (2009.01)
*H04W 52/02* (2009.01)
*H04W 76/28* (2018.01)

(52) U.S. Cl.
CPC ......... *H04W 74/002* (2013.01); *H04W 52/02* (2013.01); *H04W 52/0216* (2013.01);
(Continued)

(58) Field of Classification Search
None
See application file for complete search history.

(56) References Cited

U.S. PATENT DOCUMENTS

2011/0205976 A1 8/2011 Roessel et al.
2013/0003577 A1* 1/2013 Gupta ............... H04W 52/0225
370/252

(Continued)

FOREIGN PATENT DOCUMENTS

CN 102215534 A 10/2011
CN 102281099 A 12/2011
(Continued)

OTHER PUBLICATIONS

CATT, "Signalling Mechanisms for TDD UL-DL Reconfigurations," 3GPP TSG RAN WG1 Meeting #72, R1-130052, St. Julian's, Malta, Jan. 28, 2013-Feb. 1, 2013, 4 pgs., XP_50663298A, 3rd Generation Partnership Project.
(Continued)

*Primary Examiner* — Adnan Baig
(74) *Attorney, Agent, or Firm* — Holland & Hart LLP

(57) ABSTRACT

Methods, systems, and devices are described for discontinuous transmission and/or discontinuous reception in time division duplex (TDD) systems that may have data transmission formats dynamically reconfigured. An initial uplink-downlink (UL-DL) configuration for TDD communication between an eNB and user equipment (UE) may be established. This initial UL-DL configuration may be reconfigured to a different UL-DL configuration for one or more UEs in communication with the eNB. When a UE switches to
(Continued)

discontinuous reception (DRX) mode, it may monitor control information from the eNB during DRX on periods, a frequency of the DRX on periods based on a reference UL-DL configuration irrespective of any reconfiguration of UL-DL configuration for a particular UE. In some aspects, a UE that is operating in a UL-DL reconfiguration mode may, upon entering DRX mode, autonomously discontinue operating in the UL-DL reconfiguration mode.

26 Claims, 15 Drawing Sheets

(52) U.S. Cl.
CPC ....... *H04W 52/0235* (2013.01); *H04W 76/28* (2018.02); *Y02D 30/70* (2020.08)

(56) References Cited

U.S. PATENT DOCUMENTS

| | | | | |
|---|---|---|---|---|
| 2013/0044651 A1* | 2/2013 | Wang | ................ | H04W 72/0406 370/280 |
| 2013/0194980 A1* | 8/2013 | Yin | ...................... | H04L 1/1607 370/280 |
| 2013/0242818 A1* | 9/2013 | Heo | .......................... | H04L 5/14 370/280 |

FOREIGN PATENT DOCUMENTS

| | | | |
|---|---|---|---|
| CN | 102349347 A | 2/2012 | |
| CN | 102801514 A | 11/2012 | |
| KR | 20120125197 A | 11/2012 | |
| WO | WO-2010086498 A1 | 8/2010 | |
| WO | WO-2012113131 A1 | 8/2012 | |
| WO | WO 2012134580 A1 * | 10/2012 | ........... H04B 7/0632 |
| WO | WO-2012134580 A1 * | 10/2012 | ........... H04W 28/08 |

OTHER PUBLICATIONS

Huawei, et al., "Potential Signaling Enhancements for TDD eiMTA," 3GPP TSG RAN WG1 Meeting #72, R1-130445, St. Julian's, Malta, Jan. 28, 2013-Feb. 1, 2013, 6 pgs., XP_50663728A, 3rd Generation Partnership Project.
EPO, Supplementary European Search Report, EP App. No. 14746561, dated Jul. 25, 2016, European Patent Office, Munich, DE, 10 pgs.
ISA/CN, International Search Report and Written Opinion of the International Searching Authority, Int'l. App. No. PCT/CN2013/071076, dated Nov. 7, 2013, the State Intellectual Property Office, the People's Republic of China, Beijing, CN, 10 pgs.
ISA/CN, International Search Report and Written Opinion of the International Searching Authority, Int'l. App. No. PCT/CN2014/071550, dated May 16, 2014, the State Intellectual Property Office, the People's Republic of China, Beijing, CN, 11 pgs.
Mediatek Inc: "Discussion on Signaling to Support TDD UL-DL Reconfiguration," 3GPP TSG-RAN WG1 Meeting #72, R1-130216, St Julian's, Malta, Jan. 28-Feb. 1, 2013, pp. 1-2.

* cited by examiner

Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

200

TDD RECONFIGURATION WITH CONSIDERATION OF DTX/DRX

CROSS REFERENCES

The present Application for Patent is a 371 national phase of International Patent Application No. PCT/CN2014/071550 to QUALCOMM Incorporated et al., entitled "TDD Reconfiguration with Consideration of DTX/DRX," filed Jan. 27, 2014; which claims priority to International Patent Application No. PCT/CN2013/071076 to QUALCOMM Incorporated et al., entitled "TDD Reconfiguration with Consideration of DTX/DRX," filed Jan. 29, 2013; each of which is assigned to the assignee hereof, and expressly incorporated by reference herein.

BACKGROUND

The following relates generally to wireless communication, and more specifically to discontinuous reception and/or discontinuous transmission in wireless communication systems having reconfigurable data transmission configurations. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. Additionally, some systems may operate using time-division duplex (TDD), in which a single carrier frequency is used for both uplink and downlink communications, and some systems may operate using frequency-division duplex (FDD), in which separate carrier frequencies are used for uplink and downlink communications.

In systems that operate using TDD, different data transmission formats may be used in which uplink and downlink communications may be either symmetric or asymmetric. TDD data transmission formats may include transmission of frames of data, each including a number of different subframes in which different subframes may be uplink or downlink subframes. Reconfiguration of TDD formats may be implemented based on data traffic patterns of the particular system, in order to provide additional uplink or downlink data capacity to users of the system. Systems may also employ power reduction techniques, such as discontinuous reception and/or discontinuous transmission techniques in which a mobile device may turn off wireless transmit/receive circuitry during periods in which large amounts of data are not transmitted between the mobile device and wireless network.

SUMMARY

The described features generally relate to one or more improved systems, methods, and/or apparatuses for discontinuous transmission and/or discontinuous reception in time division duplex (TDD) systems that may have data transmission formats dynamically reconfigured. A first uplink-downlink (UL-DL) configuration for TDD communication between an eNB and user equipment (UE) may be established. The first UL-DL configuration, which may be an initial UL-DL configuration used for TDD communication between the eNB and the UE may be reconfigured to a second UL-DL configuration for one or more UEs in communication with the eNB. When a UE switches to a discontinuous reception (DRX) mode, it may monitor control information from the eNB during DRX on periods, where a frequency of the DRX on periods is based on a reference UL-DL configuration irrespective of any reconfiguration of UL-DL configuration for a particular UE. In some aspects, a UE that is operating in a UL-DL reconfiguration mode may, upon entering DRX mode, discontinue operating in the UL-DL reconfiguration mode.

In an aspect of the disclosure, a method of wireless communication performed by a user equipment (UE) in time-division duplex (TDD) communication with an eNB is provided. The method generally includes determining a first uplink-downlink (UL-DL) configuration for TDD communication with the eNB, receiving a reconfiguration message to change the first UL-DL configuration to a second UL-DL configuration to be used for TDD communication with the eNB, switching to a discontinuous reception (DRX) mode, and monitoring control information from the eNB during DRX on periods, where a frequency of the DRX on periods is based on a reference TDD UL-DL configuration irrespective of the changed UL-DL configuration. The method may further include, in some examples, changing back to the first UL-DL configuration when DRX mode is active, where the first UL-DL configuration may be an initial UL-DL configuration used for TDD communication with the eNB. In some examples, the method may further include switching out of DRX mode, and determining a new UL-DL configuration to be used for communications with the eNB. Determining the new UL-DL configuration may include receiving an indication to switch to a dynamic reconfiguration mode and a timing to initiate the switch from the eNB, and receiving the new UL-DL configuration for the subsequent radio frames. The indication to switch to the dynamic reconfiguration mode and the timing to initiate the switch may be received, for example, via one or more of Layer 1 (L1), Medium Access Control (MAC), or Radio Resource Control (RRC) signaling.

In some examples, the switching out of the DRX mode may include receiving control information from the eNB during a DRX on period. Additionally or alternatively, the switching out of the DRX mode may include determining that data is to be sent to the eNB, and transmitting an indication to the eNB that data is to be sent from the UE. The reference UL-DL configuration may be the initial UL-DL configuration, which may be received in a system information block Type1 (SIB1), for example. In other examples, the reference UL-DL configuration may be different than the initial UL-DL configuration, and may be received in a Radio Resource Control message to the UE.

In another aspect, a wireless communication UE apparatus configured to operate using one of multiple TDD UL-DL configurations is provided. The apparatus generally includes means for determining a first UL-DL configuration for TDD communication with the eNB, means for receiving a reconfiguration message to change the first UL-DL configuration to a second UL-DL configuration to be used for TDD communication with the eNB, means for switching to a DRX mode, and means for monitoring control information from the eNB during DRX on periods, with a frequency of the DRX on periods based on a reference TDD UL-DL configuration irrespective of the changed UL-DL configuration. In some examples, the apparatus may further include means for changing back to the first UL-DL configuration when the DRX mode is active, where the first UL-DL configuration may be an initial UL-DL configuration used for TDD communication with the eNB. In other examples, the apparatus may further include means for switching out of the DRX mode, and means for determining a new UL-DL configuration to be used for communications with the eNB. The means for determining the new UL-DL configuration may include, for example, means for receiving an indication to switch to a dynamic reconfiguration mode and a timing to initiate the switch from the eNB, and means for receiving the new UL-DL configuration for the subsequent radio frames. The means for switching out of the DRX mode may include, in some examples, means for receiving control information from the eNB during a DRX on period. In other examples, the means for switching out of the DRX mode may include means for determining that data is to be sent to the eNB, and means for transmitting an indication to the eNB that data is to be sent from the UE.

In another aspect of the disclosure, a wireless communication UE apparatus configured to operate using one of multiple TDD UL-DL configurations is provided. The apparatus generally includes at least one processor and a memory coupled with the processor. The processor may be configured to determine a first uplink-downlink (UL-DL) configuration for TDD communication with the eNB, receive a reconfiguration message to change the first UL-DL configuration to a second UL-DL configuration to be used for TDD communication with the eNB, switch to a DRX mode, and monitor control information from the eNB during DRX on periods, where a frequency of the DRX on periods is based on a reference TDD UL-DL configuration irrespective of the changed UL-DL configuration. The at least one processor, in some examples, may be further configured to switch out of the DRX mode and determine a new UL-DL configuration to be used for communications with the eNB. The at least one processor, in further examples, may be further configured to receive an indication to switch to a dynamic reconfiguration mode and a timing to initiate the switch from the eNB, and receive the new UL-DL configuration for the subsequent radio frames.

In another aspect of the disclosure, a computer program product for wireless communications by a UE configured to operate using one of multiple TDD UL-DL configurations is provided. The computer program product generally includes a non-transitory computer-readable medium that includes code for determining a first uplink-downlink (UL-DL) configuration for TDD communication with the eNB, receiving a reconfiguration message to change the first UL-DL configuration to a second UL-DL configuration to be used for TDD communication with the eNB, switching to a discontinuous reception (DRX) mode, and monitoring control information from the eNB during DRX on periods, where a frequency of the DRX on periods is based on a reference TDD UL-DL configuration irrespective of the changed UL-DL configuration. The computer-readable medium may, in some examples, further include code for switching out of DRX mode and determining a new UL-DL configuration to be used for communications with the eNB. The computer-readable medium, in other examples, may also include code for receiving an indication to switch to a dynamic reconfiguration mode and a timing to initiate the switch from the eNB, and receiving the new UL-DL configuration for the subsequent radio frames.

In another aspect of the disclosure, a method of wireless communication performed by a UE in TDD communication with an eNB is provided. The method generally includes entering a dynamic TDD uplink-downlink (UL-DL) reconfiguration mode using a reconfigured UL-DL configuration for TDD communication with the eNB, the reconfigured UL-DL configuration being different than an initial TDD UL-DL configuration between the UE and the eNB, and discontinuing the dynamic TDD UL-DL reconfiguration mode when entering a discontinuous reception (DRX) mode. In some examples, discontinuing the dynamic TDD UL-DL reconfiguration mode may include autonomously discontinuing the dynamic TDD UL-DL reconfiguration mode. Additionally or alternatively, discontinuing the dynamic TDD UL-DL reconfiguration mode may include entering DRX mode, and monitoring control information from the eNB during DRX on periods, where a frequency of the DRX on periods is based on a reference TDD UL-DL configuration irrespective of the reconfigured UL-DL configuration. The reference TDD UL-DL configuration may be, in some examples, the initial TDD UL-DL configuration.

In another aspect of the disclosure, a wireless communication UE apparatus configured to operate using one of multiple TDD UL-DL configurations is provided. The apparatus generally includes means for entering a dynamic TDD uplink-downlink (UL-DL) reconfiguration mode using a reconfigured UL-DL configuration for TDD communication with the eNB, the reconfigured UL-DL configuration being different than an initial TDD UL-DL configuration between the UE and the eNB, and means for discontinuing the dynamic TDD UL-DL reconfiguration mode when entering a DRX mode. The means for discontinuing the dynamic TDD UL-DL reconfiguration mode may include, for example, means for autonomously discontinuing the dynamic TDD UL-DL reconfiguration mode. The means for discontinuing the dynamic TDD UL-DL reconfiguration mode may include, in some examples, means for entering a DRX mode, and means for monitoring control information from the eNB during DRX on periods, where a frequency of the DRX on periods is based on a reference TDD UL-DL configuration irrespective of the reconfigured UL-DL configuration.

In yet another aspect of the disclosure, a wireless communication UE apparatus configured to operate using one of multiple TDD UL-DL configurations is provided. The apparatus generally includes at least one processor and a memory coupled with the processor. The at least one processor may be configured to enter a dynamic TDD uplink-downlink (UL-DL) reconfiguration mode using a reconfigured UL-DL configuration for TDD communication with the eNB, the reconfigured UL-DL configuration being different than an initial TDD UL-DL configuration between the UE and the eNB, and discontinue the dynamic TDD UL-DL reconfiguration mode when the UE enters a DRX mode. The at least one processor may further be configured to, in some examples, enter a DRX mode, and monitor control information from the eNB during DRX on periods, where a frequency of the DRX on periods is based on a reference TDD UL-DL configuration irrespective of the reconfigured UL-DL configuration.

In another aspect of the disclosure, a computer program product for wireless communications by a UE configured to operate using one of multiple TDD UL-DL configurations is provided. The computer program product generally includes a non-transitory computer-readable medium that includes code for entering a dynamic TDD UL-DL reconfiguration mode using a reconfigured UL-DL configuration for TDD communication with the eNB, the reconfigured UL-DL configuration being different than an initial TDD UL-DL configuration between the UE and the eNB, and discontinuing the dynamic TDD UL-DL reconfiguration mode when the UE enters a discontinuous reception (DRX) mode. In some examples, the computer-readable medium may also include code for entering a DRX mode, and monitoring control information from the eNB during DRX on periods, where a frequency of the DRX on periods is based on a reference TDD UL-DL configuration irrespective of the reconfigured UL-DL configuration.

In still another aspect of the disclosure, a method of wireless communication performed by an eNB in TDD communication with a UE is provided. The method generally includes determining an UL-DL configuration for TDD communication with the UE, reconfiguring the UL-DL configuration to be used for TDD communication with the UE periodically based on cell level UL and DL traffic load, and transmitting control information to the UE during discontinuous reception (DRX) on periods, with a frequency of the DRX on periods based on a reference TDD UL-DL configuration irrespective of the reconfigured UL-DL configuration of the cell. In some examples, the method may also include determining that the UE is in a DRX mode, and discontinuing the reconfiguration of the UL-DL configuration when the UE is in the DRX mode. Additionally, the method may also include, in some examples, determining that the UE is to come out of the DRX mode, activating the dynamic UL-DL reconfiguration to the UE when the UE comes out of DRX mode, and transmitting a new UL-DL configuration to be used to the UE. Activating the dynamic UL-DL reconfiguration may be based, for example, on a quantity of data that is to be transmitted to the UE. Transmitting the new UL-DL configuration may include, in some examples, transmitting an indication to switch to a dynamic reconfiguration mode and a timing to initiate the switch, and transmitting the new UL-DL configuration for the subsequent radio frames. The indication to switch to the dynamic reconfiguration mode and the timing to initiate the switch may be transmitted using one or more of Layer 1 (L1), Medium Access Control (MAC), or Radio Resource Control (RRC) signaling, for example. In some examples, determining that the UE is to come out of DRX mode may be based on a signal received from the UE. Activating the dynamic UL-DL reconfiguration may, in some examples, be based on a quantity of data that is to be transmitted from the UE. The reference UL-DL configuration may be the initial UL-DL configuration, which may be transmitted, for example, in a system information block Type1 (SIB1). In other examples, the reference UL-DL configuration may be different than the initial UL-DL configuration, and may be transmitted in a Radio Resource Control message to the UE.

In another aspect, a wireless communication eNB apparatus in TDD communication with a UE is provided. The apparatus generally includes means for determining an UL-DL configuration for TDD communication with the UE, means for reconfiguring the UL-DL configuration to be used for TDD communication with the UE periodically based on cell level UL and DL traffic load, and means for transmitting control information to the UE during discontinuous reception (DRX) on periods, where a frequency of the DRX on periods is based on a reference TDD UL-DL configuration irrespective of the reconfigured UL-DL configuration of the cell. In some examples, the apparatus may also include means for determining that the UE is in a DRX mode and means for discontinuing the reconfiguration of the UL-DL configuration when the UE is in the DRX mode. In other examples, the apparatus may also include means for determining that the UE is to come out of the DRX mode, means for activating the dynamic UL-DL reconfiguration to the UE when the UE comes out of the DRX mode, and means for transmitting a new UL-DL configuration to be used to the UE. The means for transmitting the new UL-DL configuration may include, in some examples, means for transmitting an indication to switch to a dynamic reconfiguration mode and a timing to initiate the switch, and means for transmitting the new UL-DL configuration for the subsequent radio frames.

In another aspect of the disclosure, a wireless communication eNB apparatus in TDD communication with a UE is provided. The apparatus generally includes at least one processor and a memory coupled with the processor. The at least one processor may be configured to determine an uplink-downlink (UL-DL) configuration for TDD communication with the UE, reconfigure the UL-DL configuration to be used for TDD communication with the UE periodically based on cell level UL and DL traffic load, and transmit control information to the UE during discontinuous reception (DRX) on periods, where a frequency of the DRX on periods is based on a reference TDD UL-DL configuration irrespective of the reconfigured UL-DL configuration of the cell. In some examples, the processor may further be configured to determine that the UE is to come out of DRX mode, activate the dynamic UL-DL reconfiguration to the UE when the UE comes out of DRX mode, and transmit a new UL-DL configuration to be used to the UE. The at least one processor may further be configured to, for example, transmit an indication to switch to a dynamic reconfiguration mode and a timing to initiate the switch.

In another aspect of the disclosure, a computer program product for wireless communications by an eNB configured for multiple concurrent TDD UL-DL configurations is provided. The computer program product generally includes a non-transitory computer-readable medium that includes code for determining an UL-DL configuration for TDD communication with the UE, reconfiguring the UL-DL configuration to be used for TDD communication with the UE periodically based on cell level UL and DL traffic load, and transmitting control information to the UE during discontinuous reception (DRX) on periods, where a frequency of the DRX on periods is based on a reference TDD UL-DL configuration irrespective of the reconfigured UL-DL configuration of the cell. In some examples, the computer-readable medium also includes code for determining that the UE is to come out of the DRX mode, activating the dynamic UL-DL reconfiguration to the UE when the UE comes out of DRX mode, and transmitting a new UL-DL configuration to be used to the UE. The computer-readable medium may also, in some examples, include code for transmitting an indication to switch to a dynamic reconfiguration mode and a timing to initiate the switch.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
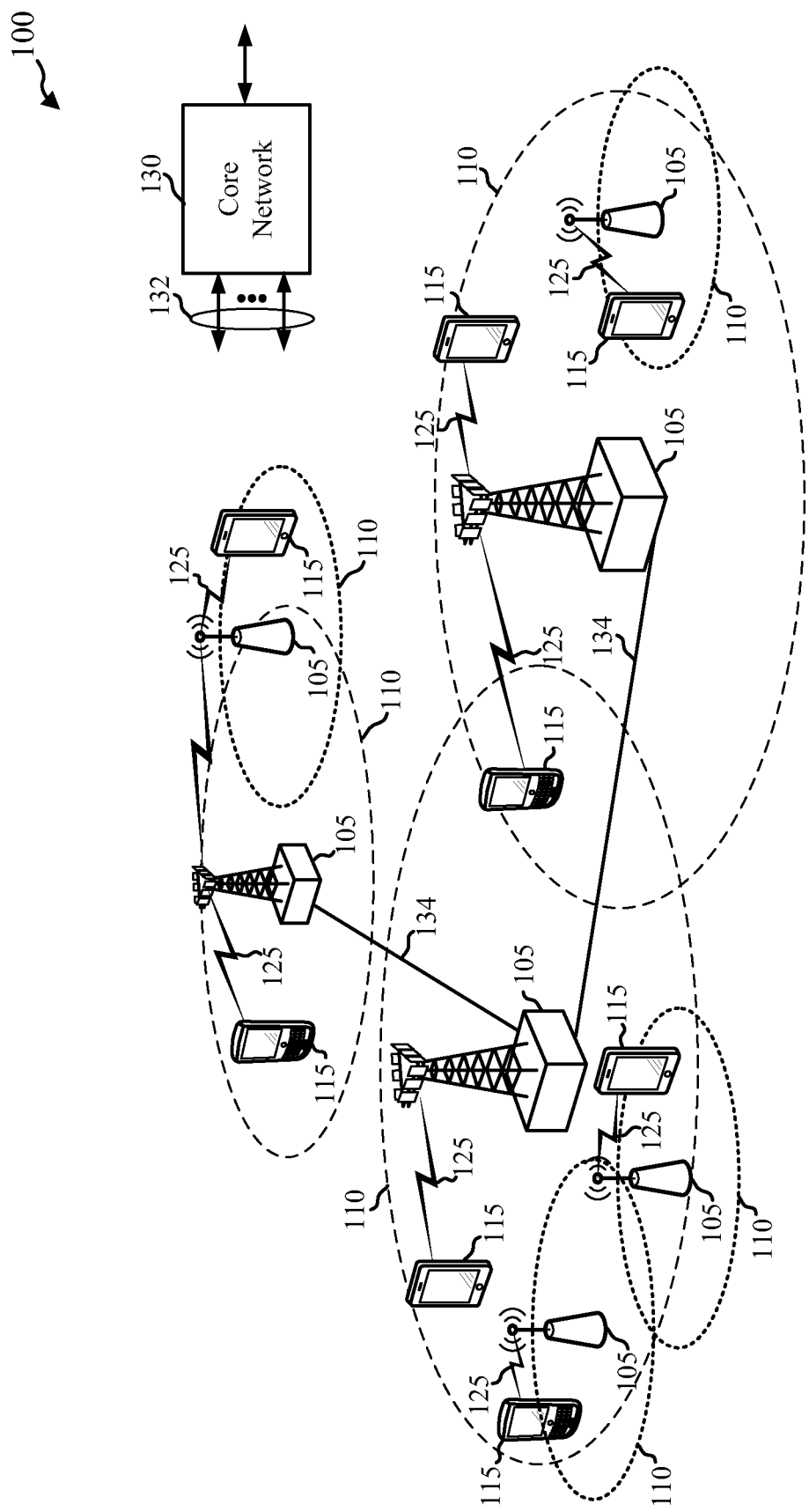
FIG. 1 is a diagram illustrating an example of a wireless communications system in accordance with various examples.

Various aspects of the disclosure provide for discontinuous transmission and/or discontinuous reception in time division duplex (TDD) systems that may have data transmission formats dynamically reconfigured. An initial uplink-downlink (UL-DL) configuration for TDD communication between an eNodeB (eNB) and user equipment (UE) may be established. This initial UL-DL configuration may be reconfigured to a different UL-DL configuration for one or more UEs in communication with the eNB. When a UE switches to a discontinuous reception (DRX) mode, it may monitor control information from the eNB during DRX on periods, where a frequency of the DRX on periods is based on a reference UL-DL configuration irrespective of any reconfiguration of UL-DL configuration for a particular UE. In some aspects, a UE that is operating in a UL-DL reconfiguration mode may, upon entering DRX mode, discontinue operating in the UL-DL reconfiguration mode.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100. The wireless communications system 100 includes eNBs (or cells) 105, user equipments (UEs) 115, and a core network 130. The eNBs 105 may communicate with the UEs 115 via communication links 125 under the control of a base station controller (not shown), which may be part of the core network 130 or the eNBs 105 in various examples. The eNBs 105 may communicate control information and/or user data with the core network 130 through backhaul links 132. Backhaul links 132 may be wired backhaul links (e.g., copper, fiber, etc.) and/or wireless backhaul links (e.g., microwave, etc.). In some examples, the eNBs 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The eNBs 105 may wirelessly communicate with the UEs 115 via one or more eNB antennas. Each of the eNB 105 sites may provide communication coverage for a respective coverage area 110. In some examples, eNBs 105 may be referred to as base stations, base transceiver stations, radio base stations, access points, radio transceivers, a basic service set (BSS), an extended service set (ESS), NodeBs, Home NodeBs, or some other suitable terminology. The coverage area 110 for an eNB 105 may be divided into sectors making up only a portion of the coverage area (not shown). The wireless communications system 100 may include eNBs 105 of different types (e.g., macro, micro, and/or pico eNBs). There may be overlapping coverage areas for different technologies.

The wireless communications system 100 may support synchronous or asynchronous operation. For synchronous operation, the eNBs 105 may have similar frame timing, and transmissions from different eNBs 105 may be approximately aligned in time. For asynchronous operation, the eNBs 105 may have different frame timing, and transmissions from different eNBs 105 may not be aligned in time. In examples, some eNBs 105 may be synchronous while other eNBs may be asynchronous.

The UEs 115 are dispersed throughout the wireless communications system 100, and each device may be stationary or mobile. A UE 115 may also be referred to by those skilled in the art as a mobile station, a subscriber station, a mobile unit, a subscriber unit, a wireless unit, a remote unit, a mobile device, a wireless device, a communication device, a wireless communication device, a remote device, a mobile subscriber station, an access terminal, a mobile terminal, a wireless terminal, a remote terminal, a handset, a user agent, a user equipment, a mobile client, a client, or some other suitable terminology. A UE 115 may be a cellular phone, a personal digital assistant (PDA), a wireless modem, a handheld device, a tablet computer, a laptop computer, a cordless phone, a wireless local loop (WLL) station, or the like. A UE 115 may be able to communicate with macro eNBs, pico eNBs, femto eNBs, relay eNBs, and the like.

The communication links 125 shown in the wireless communications system 100 may include uplink (UL) transmissions from a UE 115 to an eNB 105, and/or downlink (DL) transmissions, from an eNB 105 to a UE 115. The downlink transmissions may also be called forward link transmissions while the uplink transmissions may also be called reverse link transmissions. In some examples, the communication links 125 are TDD carriers carrying bidirectional traffic within traffic frames.

In examples, the wireless communications system 100 may be an LTE/LTE-A network. In the LTE/LTE-A network, the terms evolved Node B (eNB) and user equipment (UE) may be generally used to describe eNBs 105 and UEs 115, respectively. The wireless communications system 100 may be a Heterogeneous LTE/LTE-A network in which different types of eNBs 105 provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs 115 with service subscriptions with the network provider. A pico cell would generally cover a relatively smaller geographic area and may allow unrestricted access by UEs 115 with service subscriptions with the network provider. A femto cell would also generally cover a relatively small geographic area (e.g., a home) and, in addition to unrestricted access, may also provide restricted access by UEs 115 having an association with the femto cell (e.g., UEs in a closed subscriber group (CSG), UEs for users in the home, and the like). An eNB 105 for a macro cell may be referred to as a macro eNB. An eNB 105 for a pico cell may be referred to as a pico eNB. And, an eNB 105 for a femto cell may be referred to as a femto eNB or a home eNB. An eNB 105 may support one or multiple (e.g., two, three, four, and the like) cells.

The wireless communications system 100 according to an LTE/LTE-A network architecture may be referred to as an Evolved Packet System (EPS). The wireless communications system 100 may include one or more UEs 115, an Evolved UMTS Terrestrial Radio Access Network (E-UTRAN), an Evolved Packet Core (EPC) (e.g., core network 130), a Home Subscriber Server (HSS), and an Operator's IP Services. The wireless communications system 100 may interconnect with other access networks using other Radio Access Technologies. For example, the wireless communications system 100 may interconnect with a UTRAN-based network and/or a CDMA-based network via one or more Serving GPRS Support Nodes (SGSNs). To support mobility of UEs 115 and/or load balancing, the wireless communications system 100 may support handover of UEs 115 between a source eNB 105 and a target eNB 105. The wireless communications system 100 may support intra-RAT handover between eNBs 105 and/or base stations of the same RAT (e.g., other E-UTRAN networks), and inter-RAT handovers between eNBs 105 and/or base stations of different RATs (e.g., E-UTRAN to CDMA, etc.). The wireless communications system 100 may provide packet-switched services, however, as those skilled in the art will readily appreciate, the various concepts presented throughout this disclosure may be extended to networks providing circuit-switched services.

The E-UTRAN may include the eNBs 105 and may provide user plane and control plane protocol terminations toward the UEs 115. The eNBs 105 may be connected to other eNBs 105 via backhaul link 134 (e.g., an X2 interface). The eNBs 105 may provide an access point to the core network 130 for the UEs 115. The eNBs 105 may be connected by backhaul link 132 (e.g., an S1 interface) to the core network 130. Logical nodes within the core network 130 may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, an IP Multimedia Subsystem (IMS), and/or a Packet-Switched (PS) Streaming Service (PSS).

The UEs 115 may be configured to collaboratively communicate with multiple eNBs 105 through, for example, Multiple Input Multiple Output (MIMO), Coordinated Multi-Point (CoMP), or other schemes. MIMO techniques use multiple antennas on the eNBs 105 and/or multiple antennas on the UE 115 to take advantage of multipath environments to transmit multiple data streams. CoMP includes techniques for dynamic coordination of transmission and reception by a number of eNBs 105 to improve overall transmission quality for UEs 115 as well as increasing network and spectrum utilization. Generally, CoMP techniques utilize backhaul links 132 and/or 134 for communication between eNBs 105 to coordinate control plane and user plane communications for the UEs 115.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between the UE and the network used for the user plane data. The PDCP layer in the control plane protocol stack may perform ciphering and integrity protection. The RLC layer may be used to transfer control plane signaling. The MAC layer may be responsible for prioritizing and multiplexing logical channel data and may also support the HARQ protocol. At the Physical layer, in both the user and control planes, the transport channels may be mapped to physical channels.

LTE/LTE-A network utilizes orthogonal frequency division multiple-access (OFDMA) on the downlink and single-carrier frequency division multiple-access (SC-FDMA) on the uplink. OFDMA and SC-FDMA partition the system bandwidth into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard-band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

The wireless communications system 100 may support operation on multiple carriers. In general, operation on multiple carriers involves transmitting a multiple more narrowband signals, often referred to as subcarriers, instead of a single more wideband signal. In the case of LTE/LTE-A, operation on multiple carriers may be referred to as carrier aggregation (CA) or multi-carrier operation, where multiple carriers are aggregated and jointly used for transmission. A carrier may also be referred to as a component carrier (CC), a channel, etc. The terms "carrier," "CC," and "channel" may be used interchangeably herein. A carrier used for the downlink may be referred to as a downlink CC, and a carrier used for the uplink may be referred to as an uplink CC. A UE 115 may be configured with multiple downlink CCs and one or more uplink CCs for carrier aggregation. An eNB 105 may transmit data and control information on one or more downlink CCs to the UE 115. The UE 115 may transmit data and control information on one or more uplink CCs to the eNB 105.

The carriers may transmit bidirectional communications in FDD (e.g., paired spectrum resources) and TDD (e.g., unpaired spectrum resources) systems. TDD is a mode of the common LTE standard that is specified for the unpaired spectrum where the transmissions travel in both the downlink and uplink directions on the same frequency band. To transmit information different frame structures may be utilized in the two systems. For example, type 1 frame structure may be used for FDD transmissions and type 2 frame structure may be used for TDD transmissions. In the case of TDD, each frame structure may have a radio frame length $T_f=307200 \cdot T_s=10$ ms and may include two half-frames of length $153600 \cdot T_s=5$ ms each. Each half-frame may include five subframes of length $30720 \cdot T_s=1$ ms.

Figure 2:
FIG. 2 is a table illustrating TDD Uplink-Downlink configurations in exemplary wireless communications system in accordance with various examples.

For TDD frame structures, each subframe may carry UL or DL traffic, or may include special subframes ("S") that carry some of the DL and/or DL traffic and include a Guard Period (GP) between DL and UL traffic. Special subframes may be used to switch from DL to UL transmission. In some aspects, switching from UL to DL traffic may be achieved by setting timing advance at the UEs 115 without the use of special subframes or GP between UL and DL subframes. Allocation of UL and DL subframes within radio frames may be symmetric or asymmetric and may be reconfigured semi-statically or dynamically (e.g., through RRC messages sent via backhaul, etc.). A number of different frame format UL-DL configurations that include various allocations of UL, DL and special subframes within radio frames are supported by the TDD system. The various UL-DL configurations may be categorized according to TDD DL-UL switch-point periodicity, which may be determined from the period between special frames, with switch-point periodicity equal to the frame period (e.g., 10 ms) or half of the frame period (e.g., 5 ms) being supported by the system. For example, TDD frames may include one or more special frames, and the period between special frames may determine the TDD DL-to-UL switch-point periodicity for the frame. For LTE/LTE-A, seven different UL-DL configurations are defined that provide between 40% and 90% DL subframes as illustrated in FIG. 2 at Table 200. As indicated in Table 200, there are two switching periodicities, 5 ms and 10 ms, for the various UL-DL configurations. For configurations with 5 ms switching periodicities, there are two special subframes per frame, and for configurations with 10 ms switching periodicities there is one special subframe per frame. Some of these configurations are symmetric, having the same number of uplink and downlink slots, while some are asymmetric, having different numbers of uplink and downlink slots. For example, TDD UL-DL configuration 1 is symmetric, with four uplink and four downlink subframes, TDD UL-DL configuration 5 favors downlink throughput, and TDD UL-DL configuration 0 favors uplink throughput.

The particular TDD UL-DL configuration that is used by an eNB 105 may be based on user requirements for the particular coverage area. For example, with reference again to FIG. 1, if a relatively large number of users in a coverage area 110 are receiving more data than they are transmitting, the TDD UL-DL configuration for the associated eNB 105 may be selected to favor downlink throughput and the eNB 105 may operate using TDD UL-DL configuration 5. Similarly, if a relatively large number of users in a coverage area 110 are transmitting more data than they are receiving, the UL-DL configuration for the associated eNB 105 may be selected to favor uplink throughput and the eNB 105 may operate using UL-DL configuration 0. In some aspects, an eNB 105 may be able to dynamically reconfigure TDD UL-DL configurations on a frame-by-frame basis or on a relatively slow time scale of several frames. To dynamically reconfigure TDD UL-DL configuration, the eNB 105 may send a reconfiguration message to the UEs 115. In response, the UEs 115 may reconfigure TDD UL-DL configuration and may on subsequent TDD frames transmit/receive subframes using the new UL-DL configuration. The relatively fast switching between different UL-DL configurations allows the UEs to accommodate the instantaneous changes observed in the traffic behavior, and may provide enhanced packet throughput between the UEs 115 and the eNB 105. For example, a UE 115 that may be initially in communication with an eNB 105 using an initial TDD UL-DL configuration may be reconfigured when the initial TDD UL-DL configuration becomes unfavorable for efficient packet throughput at a later point in time. For instance, such situation may arise when the user initially receiving a relatively large amount of data switches to transmitting a relatively large amount of data. Under such circumstances, a ratio of uplink to downlink transmission data may significantly change, which may result in a previously favorable TDD UL-DL configuration becoming unfavorable.

To transmit and/or receive data in a wireless communications system 100, a UE 115 may be in a Radio Resource Control (RRC) connected state, such as RRC_CONNECTED. Additionally, a UE 115 that completes a particular data transmission or operation, and discontinues transmitting or receiving user data for a relatively long period of time may, while still in the RRC_CONNECTED state, enter into a discontinuous reception (DRX) and/or discontinuous transmission (DTX) mode. With discontinuous transmission, communication to a receiver over a channel does not occur continuously but may be cycled on and off. DRX/DTX mode may be enabled to reduce power consumption in a UE 115 during periods in which user data is not transmitted/received. While various aspects of the disclosure will be described with reference to the DRX mode, it will be readily understood that similar concepts and techniques may be employed in the DTX mode. In various aspects, the DRX mode may be enabled in RRC_IDLE state in addition to the RRC_CONNECTED state. In the RRC_IDLE state, the UE 115 is registered with the evolved packet system (EPS) mobility management entity (MME) but does not have an active session. In this state, the UE 115 may be paged for downlink (DL) traffic or may initiate uplink (UL) traffic by requesting an RRC connection with a serving eNB 105. In the RRC_CONNECTED state, a DRX mode may be enabled during, for example, the packet arrival process. In one specific example, the DRX mode may be entered from the RRC_CONNECTED Active state following the expiration of a DRX inactivity timer. The DRX inactivity timer may specify a number of physical downlink control channel (PDCCH) subframes during which the UE 115 is to monitor the PDCCH after successfully decoding a PDCCH indicating uplink or downlink user data transmission for the UE 115.

While in the DRX mode the UE 115 may power on various radio frequency reception/transmission components only during DRX on periods to monitor for data that is to be transmitted to the UE 115. In DRX mode the UE may save power by not monitoring the PDCCH in a given subframe. DRX on periods may be defined by an on duration timer, which may specify the number of PDCCH subframes during which the UE 115 is to monitor the PDCCH for possible allocations. Because in a TDD system, the timing associated with DRX on periods depends upon the particular TDD UL-DL configuration in which the UE 115 is operating, dynamically reconfiguring UL-DL configuration, as discussed above, may impact the timing of the DRX on periods. According to various examples, a UE 115 that is dynamically reconfigured to operate in a new UL-DL configuration may establish the DRX on periods according to a reference TDD UL-DL configuration. Various other examples for switching to DRX mode and establishing timing for DRX on periods will be described in more detail below.

Figure 3:
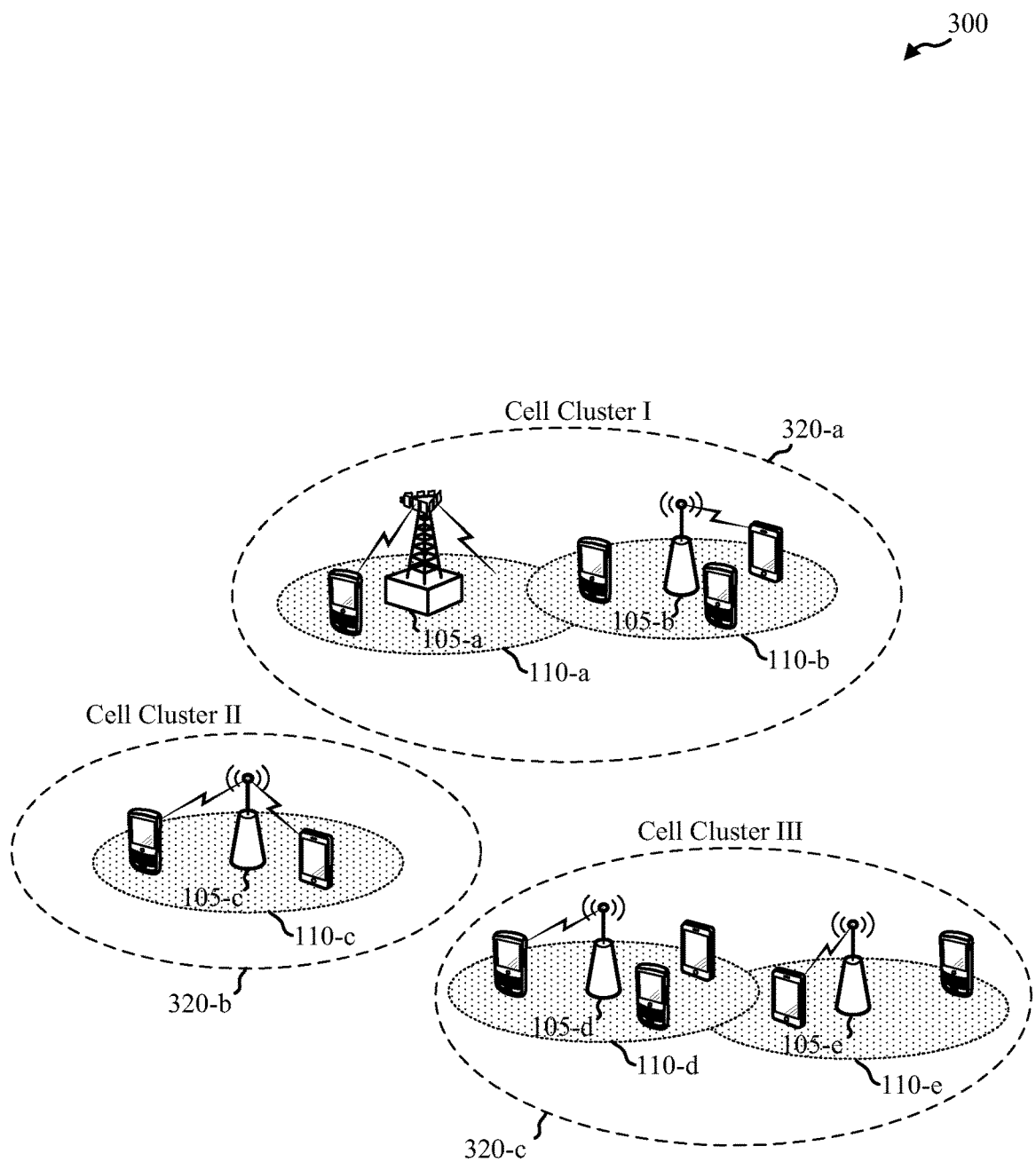
FIG. 3 illustrates a system with cells grouped according to cell clusters in accordance with various examples.

FIG. 3 illustrates a wireless communications system 300 with eNBs grouped according to cell clusters 320. The wireless communications system 300 may illustrate, for example, aspects of the wireless communications system 100 illustrated in FIG. 1. Cell clusters 320 can include one or more eNBs and eNBs within a cell cluster may be different types (e.g., macro eNB, pico eNB, femto eNB, and/or the like). As illustrated in the example of FIG. 3, the wireless communications system 300 includes cell clusters 320-a, 320-b, and 320-c. Cell cluster 320-a may include eNB 105-a and eNB 105-b, cell cluster 320-b may include eNB 105-c, and cell cluster 320-c may include eNBs 105-d and 105-e. Cell clusters 320 may be statically or semi-statically defined and each eNB 105 in a cell cluster 320 may be aware of the other eNBs 105 of its cluster. Cell clusters 320-a, 320-b, and/or 320-c may deploy TDD carriers and TDD UL-DL configuration within each cell cluster may be synchronized.

Traffic adaptation for synchronized TDD UL-DL configuration within a cell cluster 320 may be performed by coordinating TDD UL-DL reconfiguration between cells of the cluster. Semi-static (e.g., on the order of tens of frames) TDD UL-DL reconfiguration may be performed by exchanging control-plane messages among eNBs 105 (e.g., via S1 and/or X2 interfaces, etc.). While semi-static TDD UL-DL reconfiguration may provide adequate performance under some conditions, when traffic conditions within the cluster change rapidly, semi-static TDD UL-DL reconfiguration may result in sub-optimal allocation of UL-to-DL subframes for TDD carriers used in the cluster. In some aspects, rapidly changing traffic conditions may be accommodated by reconfiguring the UL-DL configuration for a particular UE 115 dynamically. The dynamic reconfiguration may be accomplished by transmitting a dynamic reconfiguration message to a UE 115 from the eNB 105 through control channel signaling, and applying the reconfiguration to one or more subsequent TDD frames. In one specific example, dynamic reconfigurations may be accomplished according to "enhanced Interference Management and Traffic Adaptation" (eIMTA).

In networks that implement eIMTA, eIMTA compatible UEs may receive dynamic reconfiguration messages indicating that the UL-DL configuration for the UE is to be changed and/or those particular subframes within a TDD frame are to be switched from an uplink to a downlink subframe. In some networks, the adaptation rate may be relatively fast, such as, for example, 10 ms, thus providing ability, in some instances, to change TDD UL-DL configurations on a frame-by-frame basis. UEs that are capable of operating according to eIMTA are referred to herein as non-legacy UEs, and UEs that are not capable of operating according to eIMTA are referred to herein as legacy UEs. Because in some situations, an eNB may be in communication with both legacy UEs and non-legacy UEs, signaling between the UEs and eNB should allow for the legacy UEs to properly operate alongside the non-legacy UEs, while also allowing for dynamic reconfiguration of the non-legacy UEs. To support legacy UEs, a downlink (DL) subframe in an established TDD UL-DL configuration, such as indicated in System Information Block Type1 (SIB1), may not be changed to an uplink (UL) subframe, as would be otherwise permitted for the non-legacy UEs, as such a change may result in a Radio Resource Management (RRM) measurement and/or periodic Channel State Information (CSI) reporting problem. An eNB operating according to eIMTA may, however, modify scheduling information for legacy UEs and configure resources to certain uplink subframes in order to "blank" DL subframes that are reconfigured to be UL subframes in non-legacy UEs. However, because the timing for DRX on periods depends upon TDD UL-DL configuration, and there may be multiple different TDD configurations for UEs in communication with the eNB (i.e. the UL-DL configuration broadcast in SIB1 and that signaled in additional RRC or control channel (e.g., L1) signaling to one or more non-legacy UEs), ambiguity related to a timing of DRX on periods, between the eNB and UEs may exist in such instances.

Figure 4:
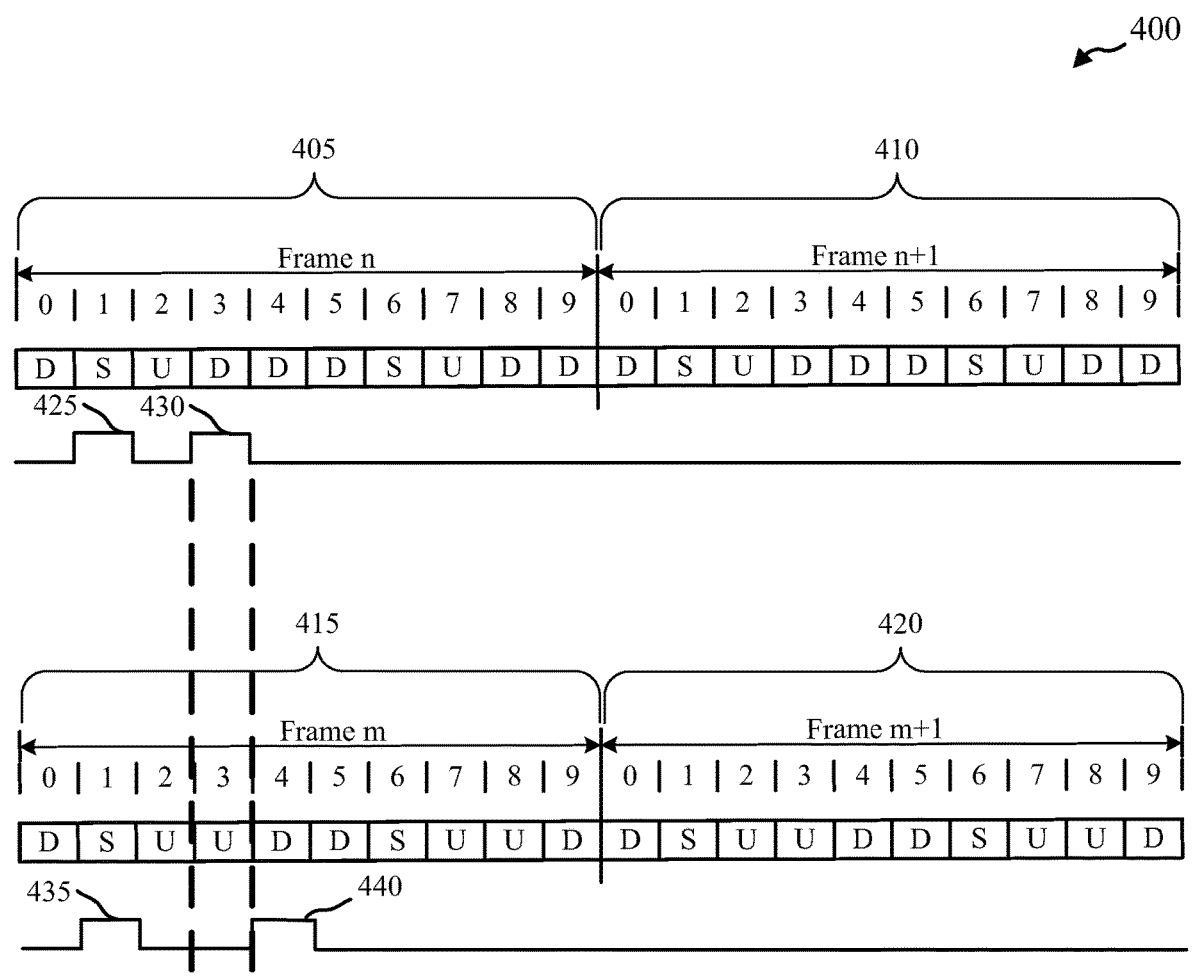
FIG. 4 shows a diagram of an exemplary TDD frames in different UL-DL configurations with associated DRX on timing in accordance with various examples.

FIG. 4 illustrates an example of multiple TDD frames 400 with differing UL-DL configurations. As discussed above, timing for downlink receptions during DRX on periods 425, 430, 435, 440 is determined according to a particular TDD UL-DL configuration. Thus, in the event that a reconfigured UE enters into a DRX mode, the timing of reception of data during DRX on periods may be impacted by the reconfiguration of the UL-DL configuration. In the example shown in FIG. 4, the first frame 405 (frame n) and second frame 410 (frame n+1) are each transmitted according to TDD UL-DL configuration 2, and a third frame 415 (frame m) and fourth frame 420 (frame m+1) are each transmitted according to TDD UL-DL configuration 1. The first frame 405 and second frame 410 may be transmitted to a UE that is operating according to TDD UL-DL configuration 2. In some examples, the serving eNB may transmit information related to the TDD UL-DL configuration for such UE in a SIB1 transmission. Furthermore, in some examples, non-legacy UEs may use this configuration as an initial UL-DL configuration. As mentioned above, in some aspects non-legacy UEs may be dynamically reconfigured to operate according to a different TDD UL-DL configuration. Thus, for example, a non-legacy UE that initially transmits/receives data according to TDD UL-DL configuration 2 may be reconfigured to transmit/receive the third frame 415 and fourth frame 420 according to TDD UL-DL configuration 1. Afterwards, the reconfigured UE may perform operations as required to transmit/receive information according to TDD UL-DL configuration 1, including, for example, timing of transmissions of hybrid automatic repeat request (HARQ) information.

As shown in the example of FIG. 4, a UE that is initially operating according to TDD UL-DL configuration 2 may power on receive components to receive data transmissions from the serving eNB during subframes 1 and 3. However, after reconfiguration of TDD UL-DL configuration, the UE operating according to TDD UL-DL configuration 1 would power on receive components to receive data transmissions from the serving eNB during subframes 1 and 4. The mismatch between the timing of DRX receptions between UEs operating according to TDD UL-DL configuration 2, and UEs operating according to TDD UL-DL configuration 1 may impact the timing of reception of data during DRX on periods.

In various aspects, the DRX on period timing to be used in DRX mode operation for eIMTA compatible UEs may be determined based on a reference TDD UL-DL configuration. For example, a UE may switch into a DRX mode, with DRX on periods determined based on a reference TDD UL-DL configuration irrespective of the TDD UL-DL configuration in which the UE may have been operating prior to switching into the DRX mode. The reference TDD UL-DL configuration may be, for example, the default TDD UL-DL configuration that is defined in the SIB1 message from a serving eNB. Alternatively, the reference TDD UL-DL configuration may be signaled to the UE through other signaling, such as RRC signaling that is transmitted to the UE, and thus the reference TDD UL-DL configuration may be different than that defined in SIB1. The reference TDD UL-DL configuration may be known by both the serving eNB and the non-legacy UE, and may be used to determine DRX timer durations, such as, for example, the DRX inactivity timer, DRX on timer, and DRX retransmission timer. In some examples, when a UE switches from an active state to DRX state, dynamic reconfiguration may be autonomously disabled, and the reference TDD UL-DL configuration may be used to establish the various DRX timers.

Figure 5:
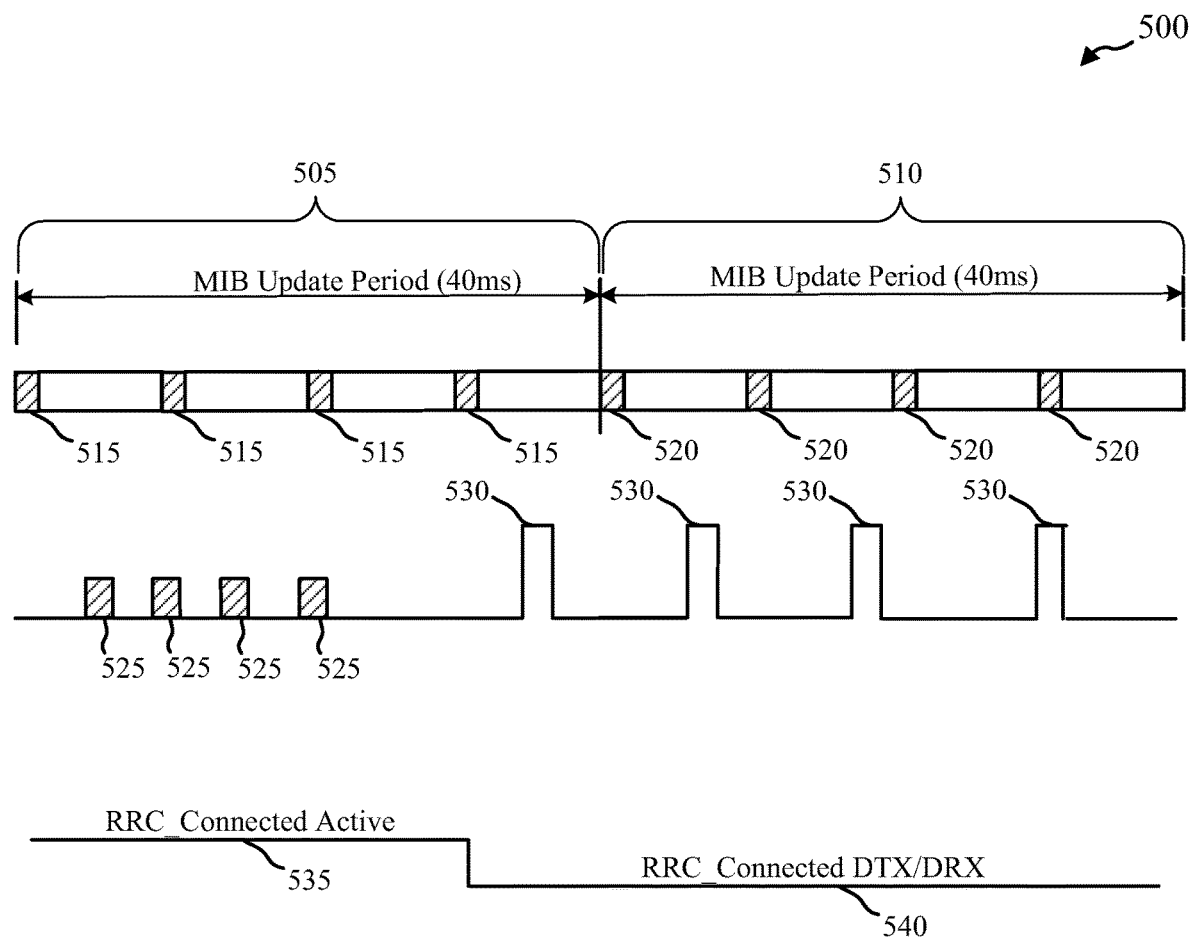
FIG. 5 shows a diagram of an exemplary timing for TDD UL-DL reconfiguration and switching to DRX mode in accordance with various examples.

For example, with reference to FIG. 5, exemplary timing 500 for a UE switching from an active state to a DRX state is described. In the example of FIG. 5, a first master information block (MIB) update period 505 and a second MIB update period 510 are illustrated. According to various aspects, an MIB update period may be used to determine the time scale that may be used for reconfiguration of TDD UL-DL configurations of non-legacy UEs. The reconfiguration time scale may, according to various examples, have a different rate, such as 10-40 ms, 200 ms, or 640 ms, corresponding to Layer 1 (L1), RRC, or broadcast signaling. In the example of FIG. 5, a 40 ms reconfiguration time scale is used, with MIBs used to inform a UE of a change in TDD UL-DL configuration. As shown in FIG. 5, a first TDD UL-DL configuration may be used in the first MIB update period 505, which may be updated to a second TDD UL-DL configuration during the second MIB update period 510. MIBs 515 transmitted during the first MIB update period 505 may be used to inform the UE of the change from the first to the second TDD UL-DL configuration. Furthermore, a change from the second TDD UL-DL configuration to a third TDD UL-DL configuration may be indicated in MIBs 520 transmitted during the second MIB update period 510. A UE may transmit/receive data packets 525 during the first MIB update period 505, while operating in an RRC_CONNECTED Active state 535. Following the expiration of a DRX inactivity timer, the UE may switch to an RRC_CONNECTED DTX/DRX mode (DRX mode) 540. In the example of FIG. 5, the UE may enter this DRX mode during the first MIB update period 505. Thus, in this example, the UE is operating according to a first TDD UL-DL configuration before it enters DRX mode 540. The UE, however, is not aware of an upcoming reconfiguration of the TDD UL-DL configuration, when it enters DRX mode, to the second TDD UL-DL configuration. As discussed above, in order to avoid ambiguity with respect to DRX timers, the UE uses a reference TDD UL-DL configuration to determine DRX timer durations when the UE is in DRX mode. In the example of FIG. 5, the DRX on times 530, thus, are determined according to the reference TDD UL-DL configuration, irrespective of the first or second TDD UL-DL configurations. According to some aspects, dynamic reconfiguration of the TDD UL-DL configuration is automatically disabled when the UE enters DRX mode.

When coming out of DRX mode a UE may, in some examples, return to an active state in the default or initial TDD UL-DL configuration signaled in SIB1. In other examples, a UE may wake up and return to an active state and switch to a dynamic configuration mode, for example, by monitoring L1 signaling periodically to receive a reconfiguration indication. The switch to a dynamic reconfiguration mode may be required in the event that the default UL-DL configuration is less than optimal for the particular data that is to be exchanged. For example, if a substantial amount of downlink data is present to be transmitted to the UE, a TDD UL-DL configuration having additional downlink subframes may be selected. The serving eNB may determine that this would be efficient, and signal the UE to enter into the dynamic configuration mode to operate according to a changed TDD UL-DL configuration. If a UE has uplink data to be transmitted, the UE may send a request to the serving eNB to switch to a dynamic reconfiguration mode. The serving eNB, upon acknowledgement of the request, may then signal the UE to enter into the dynamic configuration mode. In the event that a relatively small amount of data is to be exchanged, it may be determined to use the reference or default TDD UL-DL configuration, as such a configuration may provide adequate data transmission bandwidth.

Figure 6:
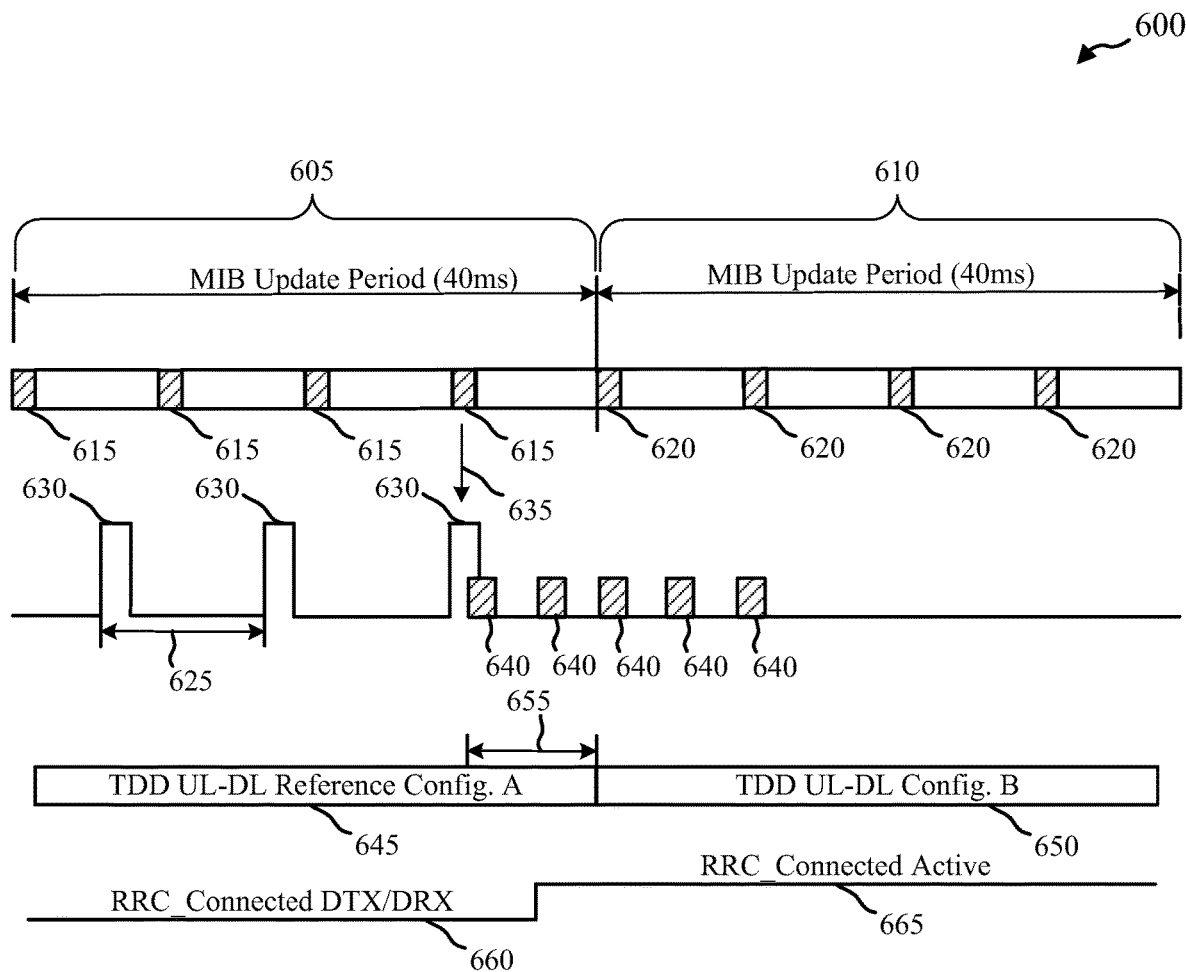
FIG. 6 shows a diagram of an exemplary timing for TDD UL-DL reconfiguration and switching from DRX mode to a reconfigured UL-DL configuration in accordance with various examples.

With reference now to FIG. 6, exemplary timing 600 for a UE switching from a DRX mode to an active mode is described. In the example of FIG. 6, a first MIB update period 605 and a second MIB update period 610 are illustrated that are similar to those described with reference to FIG. 5. The MIB update periods, as discussed above, may determine the time scale that may be used for reconfiguration of TDD UL-DL configurations of non-legacy UEs. In the example of FIG. 6, a first TDD UL-DL configuration may be used in the first MIB update period 605, which may be updated to a second TDD UL-DL configuration during the second MIB update period 610. MIBs 615 transmitted during the first MIB update period 605 may be used to inform the UE of the change from the first to the second TDD UL-DL configuration. Furthermore, a change from the second TDD UL-DL configuration to a third TDD UL-DL configuration may be indicated in MIBs 620 transmitted during the second MIB update period 610. In the example shown, the UE is in RRC_CONNECTED DTX/DRX mode 660 (also referred to as a DRX mode), during the initial portion of the first MIB update period 605. While in the DRX mode, the UE may operate according to TDD UL-DL reference configuration A 645, in a similar manner, as discussed above, in order to set various timers associated with DRX cycle 625 and DRX on times 630. During DRX cycle 625, the UE monitors the PDCCH during DRX on times 630 to determine if there is a grant to the UE to begin exchange data with the eNB. In the example of FIG. 6, a PDCCH grant 635 is transmitted to the UE, following which data packets 640 are exchanged between the UE and the serving eNB.

Initially, when the UE exits the RRC_CONNECTED DTX/DRX mode 660 and goes into RRC_CONNECTED Active mode 665, the UE continues to operate in TDD UL-DL reference configuration A 645. During time period 655, the UE may receive a reconfiguration indication, from, for example, L1 signaling, and switch to TDD UL-DL configuration B 650 during the second MIB update period 610. In some examples, the PDCCH grant 635 may include additional information to indicate to the UE that dynamic reconfiguration is to be enabled, and also the timing for when to initiate dynamic reconfiguration. According to some examples, for downlink data arrival, the UE may be signaled to switch to dynamic reconfiguration mode through two additional bits that are included with the PDCCH grant 635. A first of the two bits may indicate to the UE that dynamic reconfiguration is to be enabled, and a second bit, of the two bits, may be used to indicate when the switch is to be started. The second bit may be used to start an activation timer, at the expiration of which the UE may change to the new TDD UL-DL configuration. In some examples, the changed TDD UL-DL configuration may be started either at the beginning of the next MIB update period (e.g., the second MIB update period 610) or the MIB update period following the next MIB update period (e.g., MIB update period following the second MIB update period 610).

When determining the value to use for the activation timer bit, the serving eNB may assume that the UE needs a certain amount of time to correctly decode the configuration information from L1 signaling, such as MIBs 615. In the event that the time period between the PDCCH grant 635 and the start of the subsequent MIB update period is less than the time required for the UE to decode the configuration information, the second bit may be set to indicate the UE is to switch UL-DL configuration in the MIB update period following the subsequent MIB update period 610. In some examples, when determining the time to initiate the switch to dynamic reconfiguration mode, reliability of the UE to correctly decode the new configuration may be balanced against latency for switching in order to determine a time that will reliably allow the UE to correctly decode the new configuration. In the case of uplink data to be transmitted from the UE, the UE may request a switch to dynamic reconfiguration mode by sending a scheduling request (SR) to an eNB. In response the eNB may acknowledge the request with PDCCH grant 635 and send additional signaling for enabling the switch to dynamic reconfiguration mode. In some examples, the signaling for the switch to dynamic reconfiguration mode, and the time to initiate the switch, may be signaled through any suitable signaling mechanism, such as, for example, L1 signaling, a MAC control element, or RRC signaling. Following the initial reconfiguration, additional reconfiguration messages may be transmitted according to procedures established for dynamic reconfigurations, such as, for example, transmitting the information in MIBs 615 or 620.

Figure 7:
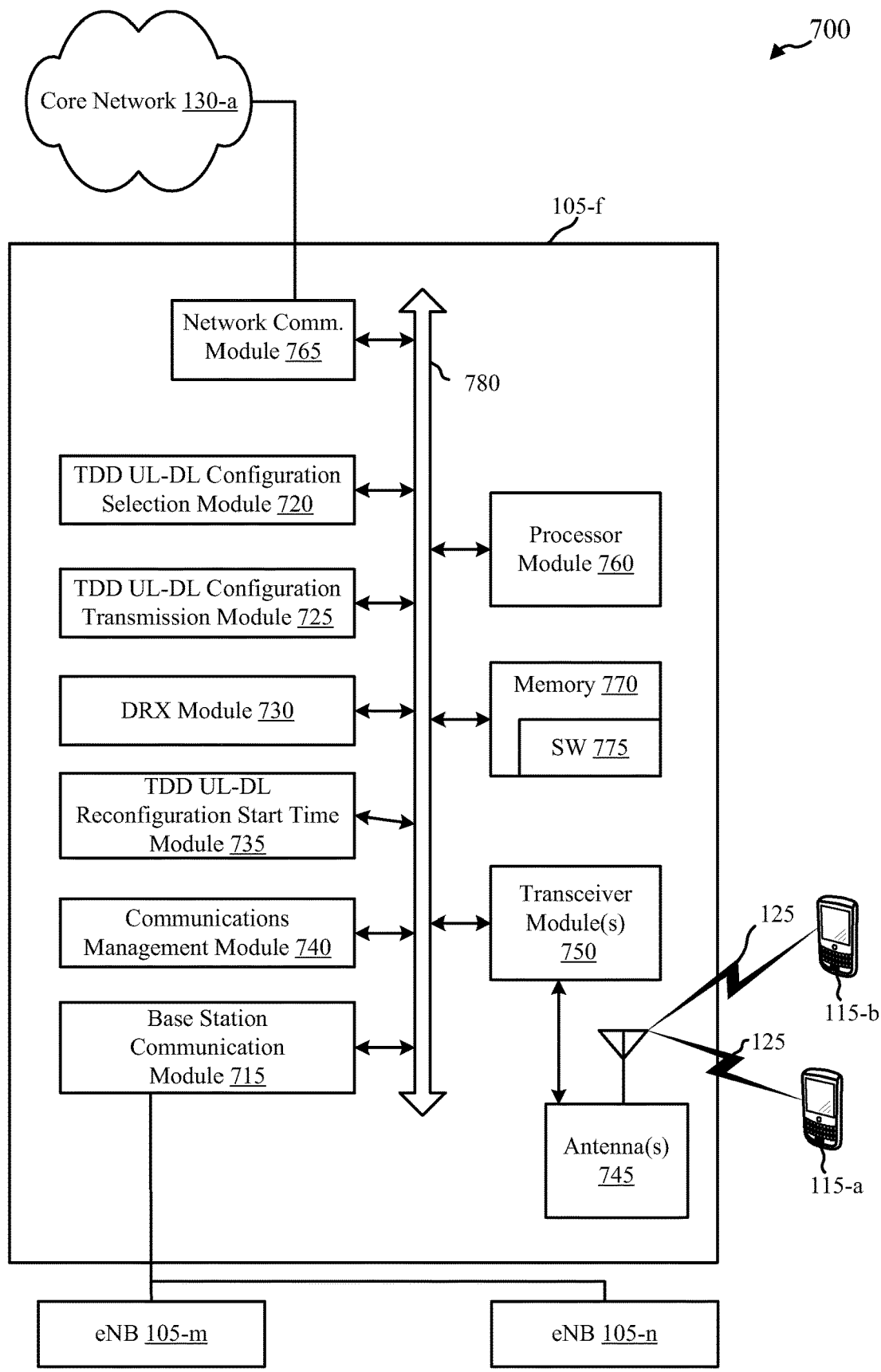
FIG. 7 shows an example of a wireless communications system and block diagram of an example of an eNB in accordance with various examples.

FIG. 7 shows a block diagram of a wireless communications system 700 that may be configured for TDD UL-DL reconfiguration and DRX. The wireless communications system 700 may be an example of aspects of the wireless communications system 100 depicted in FIG. 1, or the wireless communications system 300 of FIG. 3. The wireless communications system 700 may include an eNB 105-*f*. The eNB 105-*f* may include antenna(s) 745, a transceiver module 750, memory 770, and a processor module 760, which each may be in communication, directly or indirectly, with each other (e.g., over one or more buses 780). The transceiver module 750 may be configured to communicate bi-directionally, via the antenna(s) 745, with UEs 115-*a*, 115-*b*. The transceiver module 750 (and/or other components of the eNB 105-*f*) may also be configured to communicate bi-directionally with one or more networks. In some cases, the eNB 105-*f* may communicate with the core network 130-*a* through network communications module 765. The eNB 105-*f* may be an example of an eNodeB base station, a Home eNodeB base station, a NodeB base station, and/or a Home NodeB base station.

The eNB 105-*f* may also communicate with other eNBs 105, such as eNB 105-*m* and eNB 105-*n*. In some cases, eNB 105-*f* may communicate with other eNBs such as 105-*m* and/or 105-*n* utilizing base station communication module 715. In some examples, base station communication module 715 may provide an X2 interface within an LTE wireless communication technology to provide communication between some of the eNBs 105. In some examples, eNB 105-*f* may communicate with other eNBs through core network 130-*a*.

The memory 770 may include random access memory (RAM) and read-only memory (ROM). The memory 770 may also store computer-readable, computer-executable software code 775 containing instructions that are configured to, when executed, cause the processor module 760 to perform various functions described herein (e.g., call processing, database management, message routing, etc.). Alternatively, the computer-executable software code 775 may not be directly executable by the processor module 760 but be configured to cause the processor, e.g., when compiled and executed, to perform functions described herein.

The processor module 760 may include an intelligent hardware device, e.g., a central processing unit (CPU), a microcontroller, an application-specific integrated circuit (ASIC), etc. The transceiver module(s) 750 may include a modem configured to modulate the packets and provide the modulated packets to the antenna(s) 745 for transmission, and to demodulate packets received from the antenna(s) 745. While some examples of the eNB 105-*f* may include a single antenna 745, the eNB 105-*f* may include multiple antennas 745 for multiple links which may support carrier aggregation. For example, one or more links may be used to support macro communications with UEs 115-*a*, 115-*b*.

According to the architecture of FIG. 7, the eNB 105-*f* may further include a communications management module 740. The communications management module 740 may manage communications with other eNBs 105. By way of example, the communications management module 740 may be a component of the eNB 105-*f* in communication with some or all of the other components of the eNB 105-*f* via a bus 780. Alternatively, functionality of the communications management module 740 may be implemented as a component of the transceiver module 750, as a computer program product, and/or as one or more controller elements of the processor module 760.

In some examples, the transceiver module 750 in conjunction with antenna(s) 745, and along with other possible components of eNB 105-*f*, may determine TDD UL-DL configurations for various UEs communicating with the eNB 105-*f*, and also determine a reference TDD UL-DL configuration to be used for DRX mode operations. In some examples, eNB 105-*f* includes a TDD UL-DL configuration selection module 720 that determines a TDD UL-DL configuration for UEs 115-*a*, 115-*b*. As discussed above, in some aspects different UEs 115-*a*, 115-*b*, may include legacy UEs and non-legacy UEs, and TDD UL-DL configuration selection module 720 may determine UL-DL configurations for both legacy and non-legacy UEs. In the example of FIG. 7, UE 115-*a* may be a legacy UE, and UE 115-*b* may be a non-legacy UE. For legacy UE 115-*a*, the TDD UL-DL configuration may be transmitted using SIB1. Likewise, an initial TDD UL-DL configuration for non-legacy UE 115-*b* may be transmitted using SIB1. The initial TDD configuration may be used as a reference or default TDD UL-DL configuration for DRX mode operations, in some examples. In other examples, a separate reference TDD UL-DL configuration may be transmitted to non-legacy UE 115-*b* that is to be used for DRX mode operations at the UE.

At some point, TDD UL-DL configuration selection module 720 may determine that the UL-DL configuration for non-legacy UE 115-*b* is to be reconfigured to a different UL-DL configuration. For example, changes in traffic conditions between the eNB 105-*f* and non-legacy UE 115-*b* may change such that additional data is to be transmitted to non-legacy UE 115-*b*, in which case the TDD UL-DL configuration selection module 720 may determine that non-legacy UE 115-*b* is to be reconfigured to operate according to a different UL-DL configuration. The eNB 105-*f* may transmit the new TDD UL-DL configuration to the non-legacy UE 115-*f* through TDD UL-DL configuration transmission module 725, in conjunction with transceiver module(s) 750. TDD UL-DL configuration selection module 720 may also periodically determine that the TDD UL-DL configuration for legacy UE 115-*a* is to be changed, in which case updated SIB1 blocks may be transmitted using TDD UL-DL configuration transmission module 725, in conjunction with transceiver module(s) 750.

As mentioned above, according to various aspects an update period may determine the time scale that may be used for reconfiguration of TDD UL-DL configurations of non-legacy UEs. For example, a first TDD UL-DL configuration may be used in the first update period, which may be updated to a second TDD UL-DL configuration during the second MIB update period. When UEs 115-*a* and 115-*b* switch to a DRX mode following the expiration of a DRX inactivity timer, the DRX module 730 may be used to indicate to the non-legacy UE 115-*b* that a reference TDD UL-DL configuration is to be used to determine DRX timer durations. In one example, the DRX module may select the reference TDD UL-DL configuration to be the initial TDD UL-DL configuration that is transmitted in the SIB1. Alternatively, the DRX module may select the reference TDD UL-DL configuration to be any other configuration. The eNB 105-*f* may transmit the reference TDD UL-DL configuration to the non-legacy UE 115-*f* through DRX module 730, in conjunction with transceiver module(s) 750.

When coming out of DRX mode UE 115-*b* may, in some examples, return to an active state in the default TDD UL-DL configuration signaled in SIB1. In other examples, UE 115-*b* may wake up and return to an active state and switch to a dynamic configuration mode, for example, by monitoring L1 signaling periodically to receive a reconfiguration indication. The switch to a dynamic reconfiguration mode may be required in the event that the default UL-DL configuration is less than optimal for the particular data that is to be exchanged. In such case, the TDD UL-DL configuration selection module 720 may determine a new TDD UL-DL configuration that is to be used by UE 115-*b*. The TDD UL-DL reconfiguration start time module 735 may determine the starting time for the UE 115-*b* to begin using the new UL-DL configuration. According to some examples, TDD UL-DL reconfiguration start time module 735 may assume that the UE 115-*b* needs a certain amount of time to correctly decode the configuration information from L1 signaling (e.g., transmitted MIB). Thus, in the event that the time period between the reconfiguration indication and the start of the subsequent update period is less than the time required for the UE 115-*b* to decode the configuration information, the TDD UL-DL reconfiguration start time module 735 may send an indication to switch UL-DL configuration in the update period following the subsequent update period. In some examples, when determining the time to initiate the switch to dynamic reconfiguration mode, reliability of the UE 115-*b* to correctly decode the new configuration may be balanced against latency for switching in order to determine a time that will reliably allow the UE 115-*b* to correctly decode the new configuration.

Figure 8:
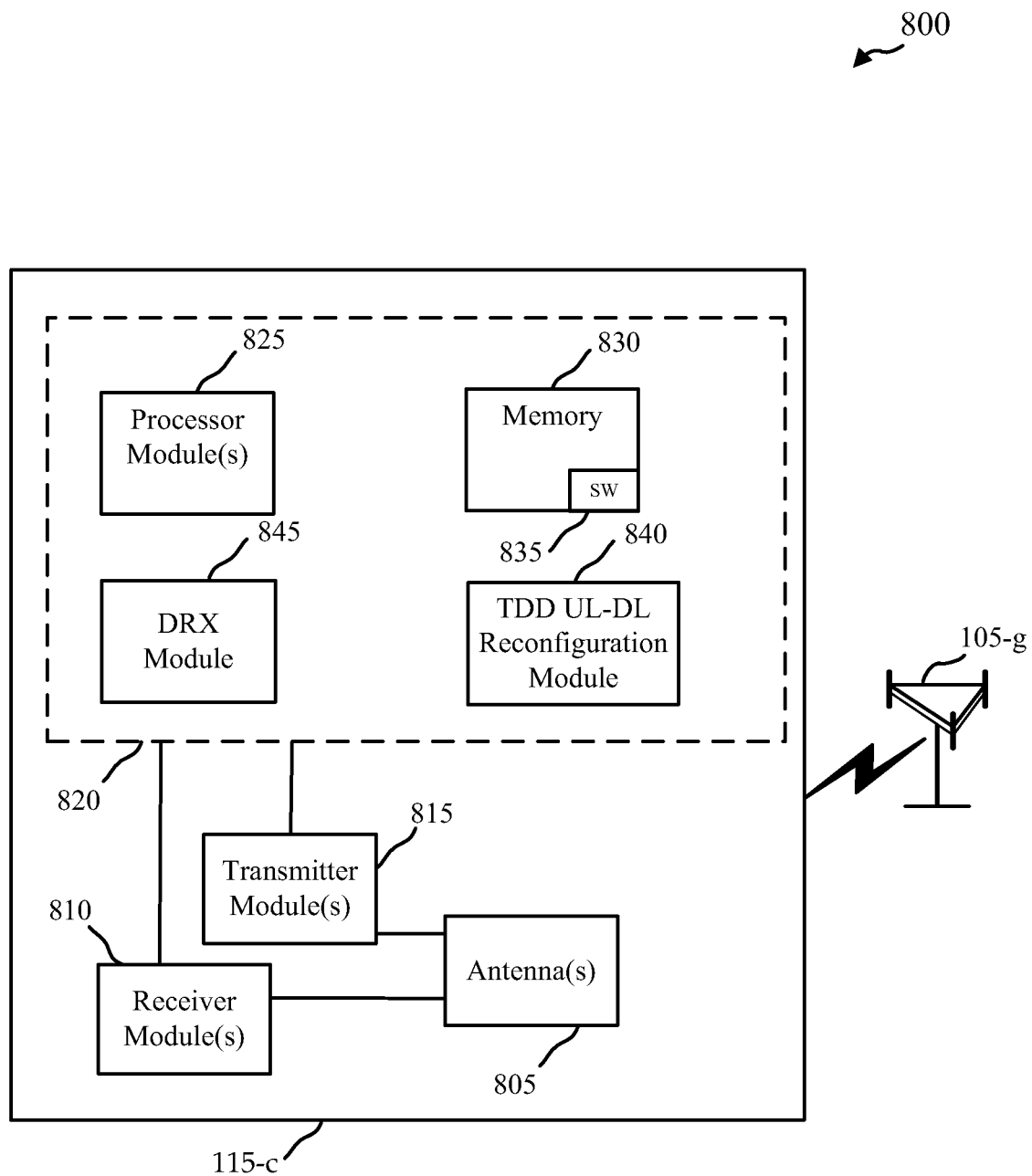
FIG. 8 shows an example of a wireless communications system and a block diagram of an example of a user equipment in accordance with various examples.

According to some examples, an eNB 105-*f* may determine the TDD UL-DL configuration and reconfiguration associated with a UE 115-*b*. The eNB 105-*f*, may also determine the reference TDD UL-DL configuration that the UE 115-*b* is to use in a DRX mode. Furthermore the eNB 105-*f* may transmit the reconfiguration information and the reference TDD UL-DL configuration information to the UE 115-*b*. The UE 115-*b* upon receiving information from the eNB 105-*f*, may switch to the new TDD UL-DL configuration, and switch to the reference TDD UL-DL configuration when it enters DRX mode. In some examples, the UE 115-*b* may autonomously switch out of a dynamic reconfiguration mode when entering DRX mode. With reference now to FIG. 8, an example wireless communications system 800 that performs TDD UL-DL reconfigurations and DRX mode operation using a reference TDD UL-DL configuration is depicted. The wireless communications system 800 includes a UE 115-*c* that may communicate with eNB 105-*g* to receive access to one or more wireless networks, and may be an example of aspects of the wireless communications system 100 of FIG. 1, the wireless communications system 300 of FIG. 3, or the wireless communications system 700 of FIG. 7. UE 115-*c* may be an example of one or more of the UEs 115 of FIG. 1, 3, or 7. UE 115-*c*, includes one or more antenna(s) 805 communicatively coupled to receiver module(s) 810 and transmitter module(s) 815, which are in turn communicatively coupled to a control module 820. Control module 820 includes one or more processor module(s) 825, a memory 830 that may include computer-executable software code 835, a TDD UL-DL reconfiguration module 840, and a DRX module 845. The computer-executable software code 835 may be for execution by processor module 825, TDD UL-DL reconfiguration module 840, and/or DRX module 845.

The processor module(s) 825 may include an intelligent hardware device, e.g., a central processing unit (CPU), a microcontroller, an application specific integrated circuit (ASIC), etc. The memory 830 may include random access memory (RAM) and read-only memory (ROM). The memory 830 may store computer-readable, computer-executable software code 835 containing instructions that are configured to, when executed (or when compiled and executed), cause the processor module 825, TDD UL-DL reconfiguration module 840, and/or DRX module 845 to perform various functions described herein (e.g., TDD UL-DL reconfiguration, and DRX operations). The TDD UL-DL reconfiguration module 840 and/or DRX module 845 may be implemented as a part of the processor module(s) 825, or may be implemented using one or more separate CPUs or ASICs, for example. The transmitter module(s) 815 may transmit to eNB 105-*g* (and/or other eNBs) to establish communications with one or more wireless communications networks (e.g., E-UTRAN, UTRAN, etc.), as described above. The TDD UL-DL reconfiguration module 840 may be configured to receive TDD reconfiguration messages from eNB 105-*g* and change a TDD UL-DL configuration based on the received messages. The DRX module 845 may be configured to monitor communications to and from the UE 115-*c*, and enter the UE 115-*c* into a DRX mode based on one or more inactivity timers. The DRX module 845 may, in some examples, cause the UE 115-*c* to discontinue operations in a UL-DL reconfiguration mode, switching the UE 115-*c* from a reconfigured TDD UL-DL mode back to an initial TDD UL-DL configuration or to a reference TDD UL-DL configuration. The DRX module 845 may also, upon waking up from DRX mode, identify signaling from the eNB 105-*g* that may indicate that the UE 115-*c* is to enter a TDD UL-DL dynamic reconfiguration mode and the timing for entering dynamic reconfiguration mode. The receiver module(s) 810 may receive downlink transmissions from the eNB 105-*g* (and/or other eNBs), as described above. Downlink transmissions are received and processed at the UE 115-*c*. The components of UE 115-*c* may, individually or collectively, be implemented with one or more Application Specific Integrated Circuits (ASICs) adapted to perform some or all of the applicable functions in hardware. Each of the noted modules may be a means for performing one or more functions related to operation of the UE 115-*c*.

Figure 9:
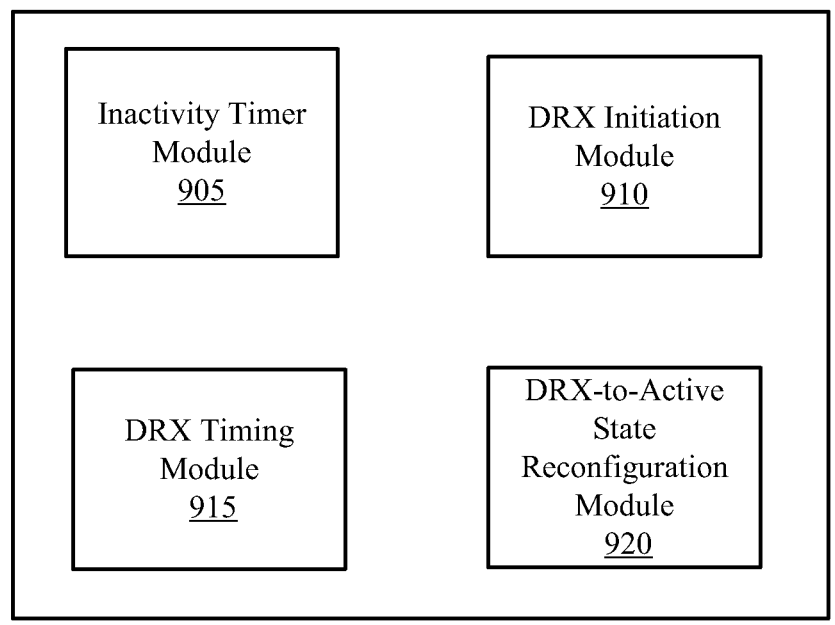
FIG. 9 shows a block diagram of an example of a DRX module in accordance with various examples.

FIG. 9 illustrates an example of a DRX module 845-*a*, which includes an inactivity timer module 905, a DRX initiation module 910, a DRX timing module 915, and a DRX-to-Active state reconfiguration module 920. The inactivity timer module 905 may monitor communications to and from the UE to determine if an inactivity period exceeds an inactivity timer and a DRX mode should be initiated. DRX initiation module 910, upon determination by the inactivity timer module 905 that DRX mode is to be initiated, initiates DRX mode. The initiation of the DRX mode may include removing power from components associated with transmission/reception. DRX timing module 915 may maintain various timers, including a DRX on timer. The timers included in the DRX timing module may be determined based on a reference TDD UL-DL configuration for the UE, irrespective of whether the UE was operating in a dynamic reconfiguration mode. DRX-to-Active state reconfiguration module 920 may determine if the UE is to exit DRX mode. The DRX-to-Active state reconfiguration module 920 may also determine if signaling that indicates that the UE is to enter a dynamic reconfiguration mode after exiting DRX mode is received. Such signaling may be, as described above, signaling indicating that dynamic reconfiguration mode is to be enabled and may also include a timing for when to start dynamic reconfiguration. The components of DRX module 845-*a* may, individually or collectively, be implemented with one or more ASICs adapted to perform some or all of the applicable functions in hardware. Each of the noted modules may be a means for performing one or more functions related to operation of the DRX module 845-*a*.

Figure 10:
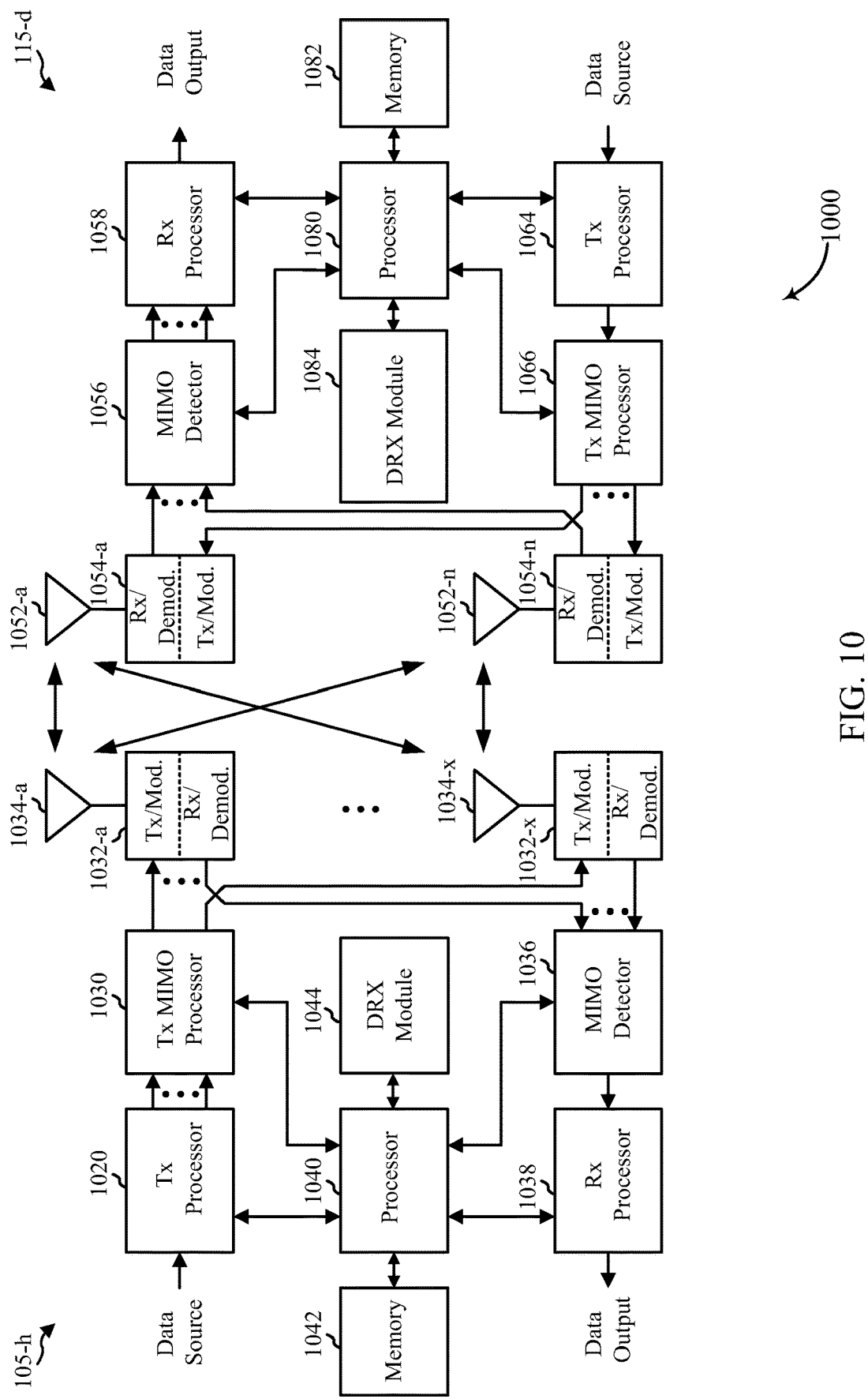
FIG. 10 is a block diagram of an example of a wireless communications system including an eNB and a UE in accordance with various examples.

FIG. 10 is a block diagram of a system 1000 including an eNB 105-*h* and a UE 115-*d*. The system 1000 may be an example of the wireless communications system 100 of FIG. 1, the wireless communications system 300 of FIG. 3, the wireless communications system 700 of FIG. 7, or the wireless communications system 800 of FIG. 8. The eNB 105-*h* may be equipped with eNB antennas 1034-*a* through 1034-*x*, and the UE 115-*d* may be equipped with UE antennas 1052-*a* through 1052-*n*. The eNB antennas 1034-*a* through 1034-*x* may be connected to eNB modulator/demodulators 1032-*a* through 1032-*x*, and the UE antennas 1052-*a* through 1052-*n* may be connected to UE modulator/demodulators 1054-*a* through 1054-*n*.

At the eNB 105-*h*, a transmit processor 1020 may receive data from a data source. The transmit processor 1020 may process the data. The transmit processor 1020 may also generate reference symbols, and a cell-specific reference signal. A transmit (TX) MIMO processor 1030 may perform spatial processing (e.g., precoding) on data symbols, control symbols, and/or reference symbols, if applicable, and may provide output symbol streams to the eNB modulator/demodulators 1032-*a* through 1032-*x*. Each eNB modulator/demodulator 1032 may process a respective output symbol stream (e.g., for OFDM, etc.) to obtain an output sample stream. Each eNB modulator/demodulator 1032 may further process (e.g., convert to analog, amplify, filter, and upconvert) the output sample stream to obtain a downlink (DL)

signal. In one example, DL signals from eNB modulator/demodulators 1032-a through 1032-x may be transmitted via the eNB antennas 1034-a through 1034-x, respectively according to a particular TDD UL-DL configuration.

At the UE 115-d, the UE antennas 1052-a through 1052-n may receive the DL signals according to the particular TDD UL-DL configuration from the eNB 105-h and may provide the received signals to the UE modulator/demodulators 1054-a through 1054-n, respectively. Each UE modulator/demodulator 1054 may condition (e.g., filter, amplify, downconvert, and digitize) a respective received signal to obtain input samples. Each UE modulator/demodulator 1054 may further process the input samples (e.g., for OFDM, etc.) to obtain received symbols. A MIMO detector 1056 may obtain received symbols from all the UE modulator/demodulators 1054-a through 1054-n, perform MIMO detection on the received symbols if applicable, and provide detected symbols. A receive processor 1058 may process (e.g., demodulate, deinterleave, and decode) the detected symbols, providing decoded data for the UE 115-d to a data output, and provide decoded control information to a processor 1080, or memory 1082. The processor 1080 may be coupled with a DRX module 1084 that may determine if DRX mode is to be initiated and a reference TDD UL-DL configuration to use for DRX timing purposes for UE 115-d, such as described above. The processor 1080 may perform frame formatting according to a current TDD UL-DL configuration, and may thus flexibly configure the TDD UL-DL frame structure based on the current TDD UL-DL configuration of the eNB 105-h.

On the uplink (UL), at the UE 115-d, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the UE modulator/demodulators 1054-a through 1054-n (e.g., for SC-FDMA, etc.), and be transmitted to the eNB 105-h in accordance with the transmission parameters received from the eNB 105-h. At the eNB 105-h, the UL signals from the UE 115-d may be received by the eNB antennas 1034, processed by the eNB modulator/demodulators 1032, detected by a MIMO detector 1036 if applicable, and further processed by a receive processor 1038. The receive processor 1038 may provide decoded data to a data output and to the processor 1040. A memory 1042 may be coupled with the processor 1040. The processor 1040 may perform frame formatting according to a current TDD UL/DL configuration. A DRX module 1044 may, in some examples, configure or reconfigure the eNB 105-h, or one or more carriers of the eNB 105-h, to operate according to a reference TDD UL-DL configuration during DRX mode operations of UE 115-d, and to transmit information related to the dynamic reconfiguration of the UE 115-d after exiting DRX mode, similarly as described above. System 1000 may support operation on multiple component carriers, each of which includes waveform signals of different frequencies that are transmitted between eNB 105-h and UEs 115-d. Multiple component carriers may carry uplink and downlink transmissions between UE 115-d and eNB 105-h, and eNB 105-h may support operation on multiple component carriers that may each have different TDD configurations. The components of the UE 115-d may, individually or collectively, be implemented with one or more Application Specific Integrated Circuits (ASICs) adapted to perform some or all of the applicable functions in hardware. Each of the noted modules may be a means for performing one or more functions related to operation of the system 1000. Similarly, the components of the eNB 105-h may, individually or collectively, be implemented with one or more Application Specific Integrated Circuits (ASICs) adapted to perform some or all of the applicable functions in hardware. Each of the noted components may be a means for performing one or more functions related to operation of the system 1000.

Figure 11:
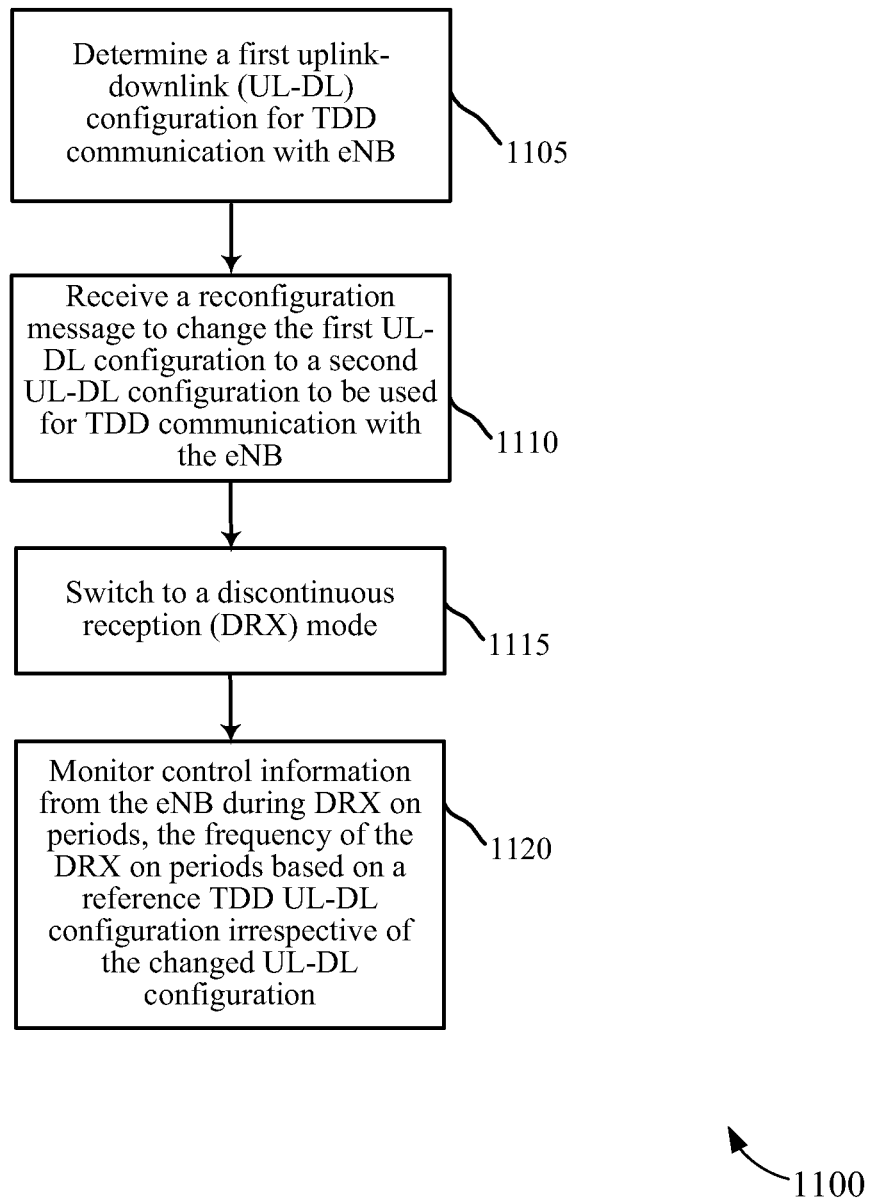
FIG. 11 is a flowchart of a method for switching a UE to DRX mode in accordance with various examples.

FIG. 11 illustrates a method 1100 that may be carried out by a UE of a wireless communications system according to various examples. The method 1100 may, for example, be performed by a UE 115 of FIG. 1, 3, 7, 8, or 10, or using any combination of the devices described for these figures. Initially, at block 1105, the UE determines a first UL-DL configuration for TDD communication with an eNB. In certain examples, the first UL-DL configuration may be an initial UL-DL configuration that is to be used for TDD communication with the eNB and may be determined from the information included in a SIB1 message received from the eNB. At block 1110, upon determining that a reconfiguration of the UL-DL configuration is desirable due to, for example, observed changes in traffic conditions, the UE receives a reconfiguration message to change the UL-DL configuration to be used for TDD communication with the eNB. The message may indicate to the UE to change from the first UL-DL configuration to a second UL-DL configuration. In case of non-legacy UEs that operate according to eIMTA, reconfiguration of the TDD UL-DL configuration may be done dynamically. At block 1115, in an event of a detected inactivity at the UE, the UE switches to a discontinuous reception (DRX) mode. In certain examples, switching to the DRX mode may be based on the expiration of an inactivity timer. At block 1120, while in the DRX mode, the UE monitors control information from the eNB during DRX on periods. According to one example, the frequency of the DRX on periods may be based on a reference TDD UL-DL configuration irrespective of the changes in the UL-DL configuration. In one particular example, the reference TDD UL-DL configuration may be the initial UL-DL configuration received in a SIB1 message, or may be a different UL-DL configuration received by the UE in a RRC message. In some examples, the UE, upon entering DRX mode, may discontinue operating in the reconfigured UL-DL configuration, and may change back to the initial UL-DL configuration autonomously.

Figure 12:
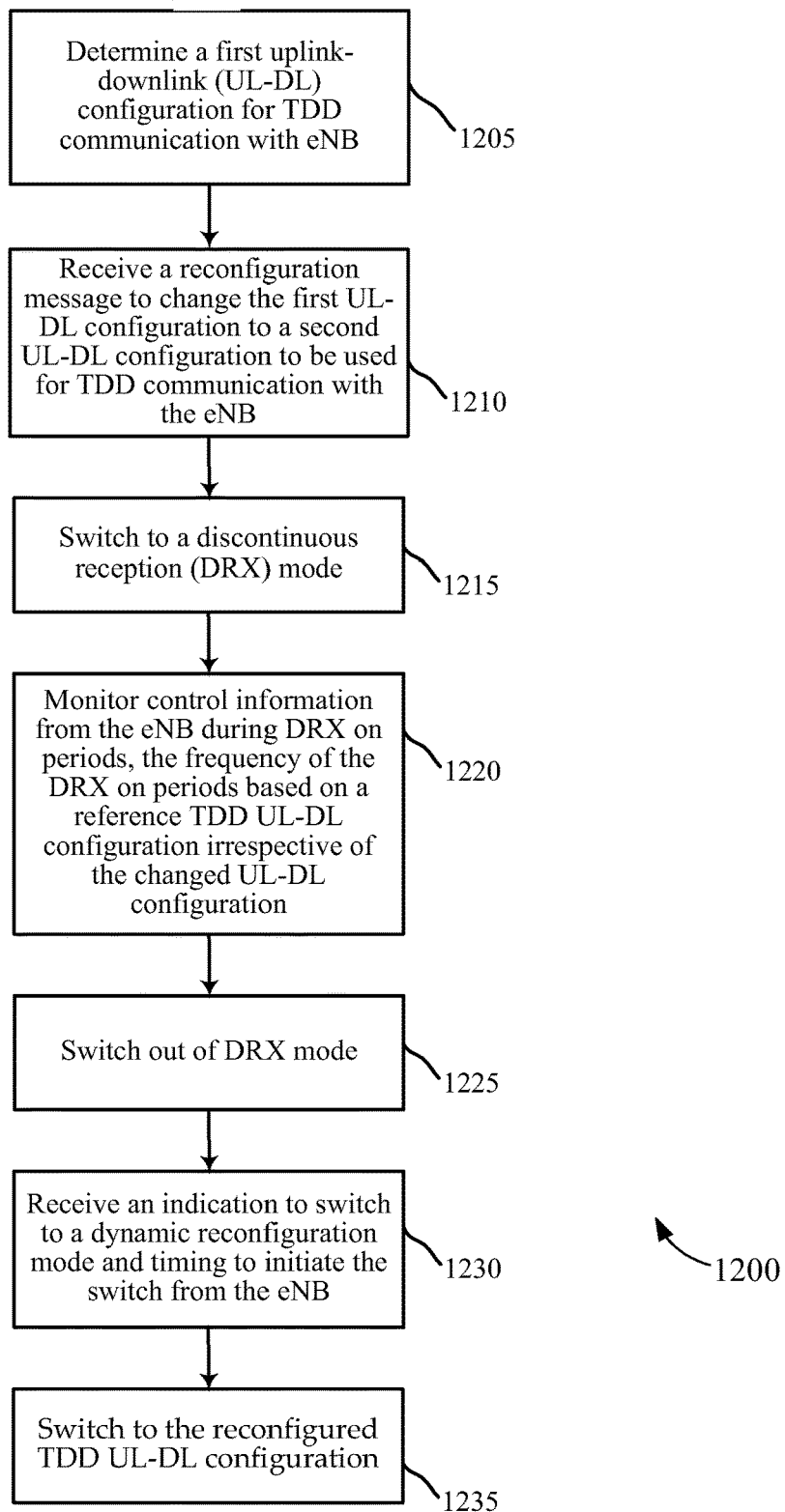
FIG. 12 is a flowchart of another method for switching a UE to DRX mode in accordance with various examples.

FIG. 12 illustrates another method 1200 that may be carried out by a UE of a wireless communications system according to various examples. The method 1200 may, for example, be performed by a UE 115 of FIG. 1, 3, 7, 8, or 10, or using any combination of the devices described for these figures. Initially, at block 1205, the UE determines a first UL-DL configuration for TDD communication with an eNB. In one example, the first UL-DL configuration may be an initial UL-DL configuration that is to be used for TDD communication with the eNB and may be determined from the information included in a SIB1 message received from the eNB. At block 1210, upon determining that a reconfiguration of the UL-DL configuration is desirable due to, for example, observed changes in traffic conditions, the UE receives a reconfiguration message to change the UL-DL configuration to be used for TDD communication with the eNB. The message may indicate to the UE to change from the first UL-DL configuration to a second UL-DL configuration. In case of non-legacy UEs that operate according to eIMTA reconfiguration of the TDD UL-DL configuration may be done dynamically. At block 1215, in an event of a detected inactivity at the UE, the UE switches to a discontinuous reception (DRX) mode. In certain examples, switching to DRX mode may be based on the expiration of an inactivity timer. At block 1220, while in the DRX mode, the UE monitors control information from the eNB during DRX on periods. According to one particular example, the frequency of the DRX on periods may be based on a reference TDD UL-DL configuration irrespective of the changes in the UL-DL configuration. As mentioned above, in one example, the reference TDD UL-DL configuration may be the initial UL-DL configuration received in a SIB1 message, or may be a different UL-DL configuration received by the UE in a RRC message. At block 1225, the UE switches out of DRX mode in response to control information received from an eNB. In certain examples, switching out of DRX mode may be a result of, for example, receiving control information from an eNB indicating that data is to be transmitted to the UE. In some examples, the switching out of DRX mode may occur to allow the UE to send data to the eNB. In such case, the UE may first transmit an indication to the eNB that data is to be sent from the UE, and switch out of DRX mode. At block 1230, in order to allow the UE to switch to different UL-DL configuration in response to, for example, changes observed in traffic conditions, the UE receives an indication to switch to a dynamic reconfiguration mode and the timing to initiate the switch from the eNB. The indication to switch to a dynamic reconfiguration mode and the timing to initiate the switch may be received, for example, via one or more of L1, MAC, or RRC signaling. At block 1235, the UE changes to the reconfigured TDD UL-DL configuration.

Figure 13:
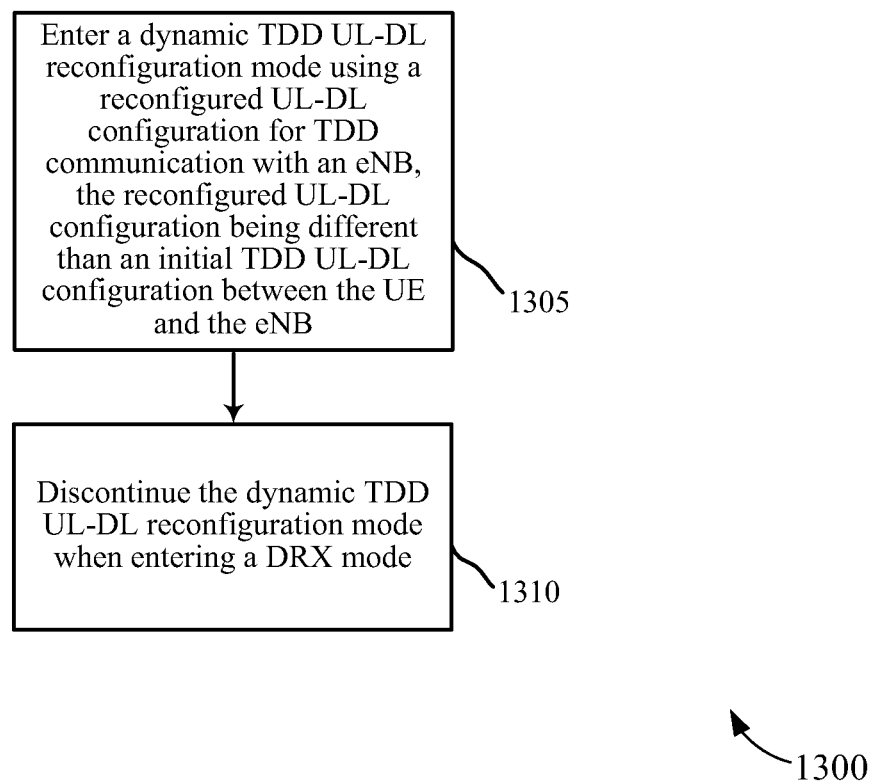
FIG. 13 is a flowchart of another method for switching a UE to DRX mode in accordance with various examples.

FIG. 13 illustrates another method 1300 that may be carried out by a UE in a wireless communications system according to various examples. The method 1300 may, for example, be performed by a UE 115 of FIG. 1, 3, 7, 8, or 10, or using any combination of the devices described for these figures. Initially, at block 1305, the user equipment enters a dynamic TDD UL-DL reconfiguration mode using a reconfigured UL-DL configuration for TDD communication with the eNB. The reconfigured UL-DL configuration entered by the UE may be different than an initial TDD UL-DL configuration between the UE and the eNB. At block 1310, the UE discontinues the dynamic TDD UL-DL reconfiguration mode when entering a discontinuous reception (DRX) mode. In certain examples, the UE may autonomously discontinue the dynamic TDD UL-DL reconfiguration mode upon entering the DRX mode. In some examples, while in the DRX mode the UE may monitor control information from the eNB during DRX on periods, with the frequency based on a reference TDD UL-DL configuration irrespective of the reconfigured UL-DL configuration. The reference TDD UL-DL configuration may be, for example, the initial TDD UL-DL configuration.

Figure 14:
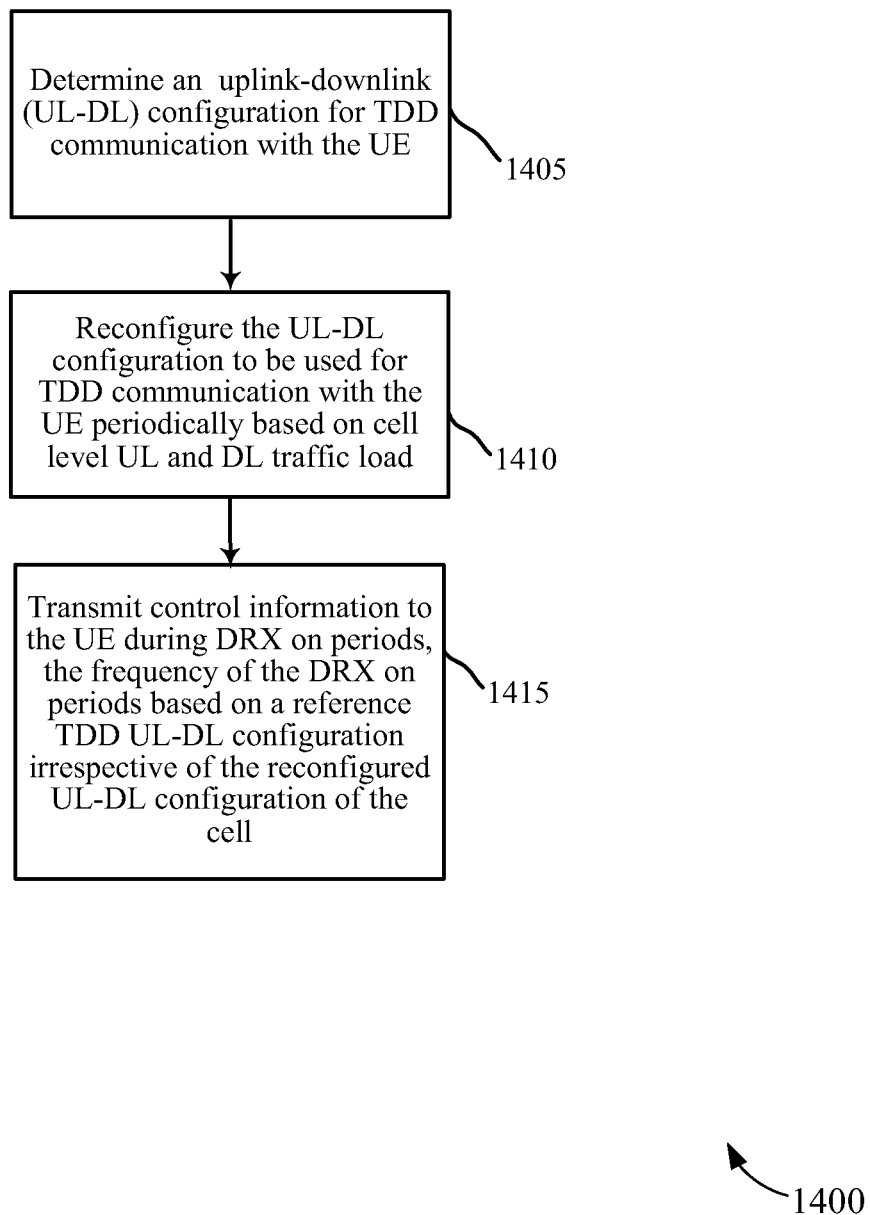
FIG. 14 is a flowchart of a method for DRX operation at an eNB in accordance with various examples.

FIG. 14 illustrates a method 1400 that may be carried out by an eNB in a wireless communications system according to various examples. The method 1400 may, for example, be performed by an eNB 105 of FIG. 1, 3, 7, 8, or 10, or using any combination of the devices described for these figures. Initially, at block 1405, the eNB determines an uplink-downlink (UL-DL) configuration for TDD communication with an UE. In some examples, the UL-DL configuration may be an initial UL-DL configuration to be used for TDD communication with the UE. At block 1410, the eNB reconfigures the UL-DL configuration to be used for TDD communication with the UE periodically based on cell level UL and DL traffic load. Finally, at block 1415, the eNB transmits control information to the UE during discontinuous reception (DRX) on periods. In one specific example, the frequency of the DRX on periods may be based on a reference TDD UL-DL configuration irrespective of the reconfigured UL-DL configuration of the cell. The reference UL-DL configuration may be the initial UL-DL configuration transmitted in a system information block Type1 (SIB1) message. Alternatively, the reference UL-DL configuration may be different than the initial UL-DL configuration and may be transmitted to the UE, for example, in a RRC message. In some examples, the eNB, upon determining that the UE is in DRX mode may discontinue reconfiguration of the UL-DL configuration.

Figure 15:
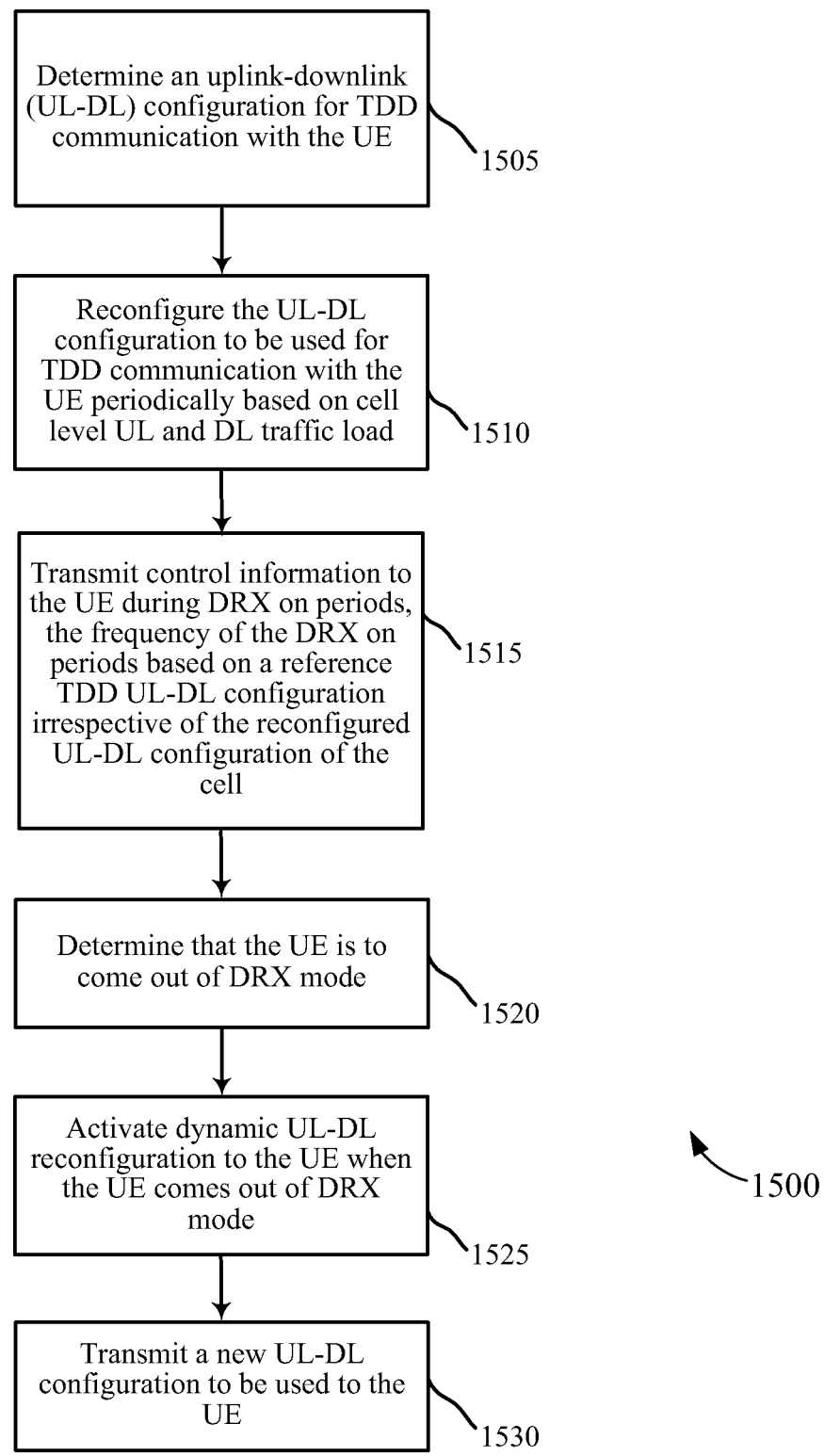
FIG. 15 is a flowchart of another method for DRX operation at an eNB in accordance with various examples.

FIG. 15 illustrates a method 1500 that may be carried out by an eNB in a wireless communications system according to various examples. The method 1500 may, for example, be performed by an eNB 105 of FIG. 1, 3, 7, 8, or 10, or using any combination of the devices described for these figures. Initially, at block 1505, the eNB determines an uplink-downlink (UL-DL) configuration for TDD communication with a UE. In some examples, the UL-DL configuration may be an initial UL-DL configuration to be used for TDD communication with the UE. At block 1510, the eNB periodically reconfigures the UL-DL configuration to be used for TDD communication with the UE based on cell level UL and DL traffic load. At block 1515, the eNB transmits control information to the UE during discontinuous reception (DRX) on periods. In one specific example, the frequency of the DRX on periods may be based on a reference TDD UL-DL configuration irrespective of the reconfigured UL-DL configuration of the cell. The reference UL-DL configuration may be the initial UL-DL configuration transmitted in a system information block Type1 (SIB1) message. Alternatively, the UL-DL configuration may be different than the initial UL-DL configuration and may be transmitted to the UE, for example, in an RRC message. In some examples, the eNB upon determining that the UE is in a DRX mode may discontinue reconfiguration of the UL-DL configuration.

At block 1520, the eNB determines that the UE is to come out of the DRX mode. In various aspects, such a determination may be made based on the presence of downlink data for transmission to the UE, or in response to receiving a scheduling request (SR) from the UE indicating that the UE has uplink data to transmit to the eNB. At block 1525, when the UE comes out of the DRX mode the eNB may activate dynamic UL-DL reconfiguration to the UE. In some examples, as described above, this activation may be accomplished by transmitting information to the UE indicating that a new UL-DL configuration is to be used and a time to begin using the new UL-DL configuration. In some examples, the new UL-DL configuration may be different from the reference UL-DL configuration. Finally, at block 1530, the eNB transmits to the UE the new UL-DL configuration to be used in communication with the UE. The switch to the dynamic UL-DL reconfiguration after the UE comes out of the DRX mode may be based on a quantity of data that is to be transmitted to the UE, for example. In one specific example, the indication to switch to a dynamic reconfiguration mode and the timing to initiate the switch may be transmitted, for example, using one or more of L1, MAC, or RRC signaling.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication performed by a user equipment (UE) in time-division duplex (TDD) communication with a base station, comprising:
   receiving, from the base station, a System Information Block (SIB) comprising a first uplink-downlink (UL-DL) configuration for TDD communication with the base station;
   receiving, from the base station, a Radio Resource Control (RRC) message comprising a second UL-DL configuration for TDD communication with the base station;
   receiving a reconfiguration message to change the first UL-DL configuration to the second UL-DL configuration;
   switching to a discontinuous reception (DRX) mode;
   monitoring control information from the base station during DRX on periods, wherein a frequency of the DRX on periods is based on a reference TDD UL-DL configuration, and wherein the frequency of the DRX on periods is irrespective of the second UL-DL configuration; and
   changing back to the first UL-DL configuration while switched to the DRX mode, the first UL-DL configuration being an initial UL-DL configuration.

2. The method of claim 1, further comprising:
   switching out of the DRX mode; and
   determining a new UL-DL configuration to be used for communications with the base station.

3. The method of claim 2, wherein determining the new UL-DL configuration comprises:
   receiving an indication to switch to a dynamic reconfiguration mode and a timing to initiate the switch from the base station; and
   receiving the new UL-DL configuration for a subsequent radio frames.

4. The method of claim 3, wherein the indication to switch to the dynamic reconfiguration mode and the timing to initiate the switch are received via one or more of Layer 1 (L1), Medium Access Control (MAC), or RRC signaling.

5. The method of claim 2, wherein the switching out of the DRX mode comprises:
   receiving control information from the base station during a DRX active period.

6. The method of claim 2, wherein the switching out of the DRX mode comprises:

determining that data is to be sent to the base station; and transmitting an indication to the base station that data is to be sent from the UE.

7. The method of claim 1, wherein the reference TDD UL-DL configuration is the first UL-DL configuration, the first UL-DL configuration being an initial UL-DL configuration.

8. The method of claim 7, wherein the initial UL-DL configuration is received in a SIB Type1.

9. The method of claim 1, wherein the reference TDD UL-DL configuration is different than the first UL-DL configuration, the first UL-DL configuration being an initial UL-DL configuration.

10. The method of claim 9, wherein the reference TDD UL-DL configuration is received in a RRC message to the UE.

11. A wireless communication user equipment (UE) apparatus configured to operate using one of multiple time-division duplex (TDD) uplink-downlink (UL-DL) configurations, comprising:
means for receiving, from a base station, a System Information Block (SIB) comprising a first uplink-downlink (UL-DL) configuration for TDD communication with the base station;
means for receiving, from the base station, a Radio Resource Control (RRC) message comprising a second UL-DL configuration for TDD communication with the base station;
means for receiving a reconfiguration message to change the first UL-DL configuration to the second UL-DL configuration;
means for switching to a discontinuous reception (DRX) mode;
means for monitoring control information from the base station during DRX on periods, wherein a frequency of the DRX on periods is based on a reference TDD UL-DL configuration, and wherein the frequency of the DRX on periods is irrespective of the second UL-DL configuration; and
means for changing back to the first UL-DL configuration while switched to the DRX mode, the first UL-DL configuration being an initial UL-DL configuration.

12. The apparatus of claim 11, further comprising:
means for switching out of the DRX mode; and
means for determining a new UL-DL configuration to be used for communications with the base station.

13. The apparatus of claim 12, wherein the means for determining the new UL-DL configuration comprises:
means for receiving an indication to switch to a dynamic reconfiguration mode and a timing to initiate the switch from the base station; and
means for receiving the new UL-DL configuration for a subsequent radio frame.

14. The apparatus of claim 13, wherein the indication to switch to the dynamic reconfiguration mode and the timing to initiate the switch are received via one or more of Layer 1 (L1), Medium Access Control (MAC), or RRC signaling.

15. The apparatus of claim 12, wherein the means for switching out of the DRX mode comprises:
means for receiving control information from the base station during a DRX active period.

16. The apparatus of claim 12, wherein the means for switching out of the DRX mode comprises:
means for determining that data is to be sent to the base station; and
means for transmitting an indication to the base station that data is to be sent from the UE.

17. A wireless communication user equipment (UE) apparatus configured to operate using one of multiple time-division duplex (TDD) uplink-downlink (UL-DL) configurations, comprising:
at least one processor; and
memory coupled to the at least one processor, the memory storing instructions executable by the at least one processor to cause the UE to:
receive, from a base station, a System Information Block (SIB) comprising a first uplink-downlink (UL-DL) configuration for TDD communication with the base station;
receive, from the base station, a Radio Resource Control (RRC) message comprising a second UL-DL configuration for TDD communication with the base station;
receive a reconfiguration message to change the first UL-DL configuration to the second UL-DL configuration;
switch to a discontinuous reception (DRX) mode; and
monitor control information from the base station during DRX on periods, wherein a frequency of the DRX on periods is based on a reference TDD UL-DL configuration, wherein the frequency of the DRX on periods is irrespective of the second UL-DL configuration; and
change back to the first UL-DL configuration while switched to the DRX mode, the first UL-DL configuration being an initial UL-DL configuration
and memory coupled to the at least one processor.

18. The apparatus of claim 17, wherein the instructions executable by the at least one processor to cause the UE to:
switch out of the DRX mode; and
determine a new UL-DL configuration to be used for communications with the base station.

19. The apparatus of claim 18, wherein the determine the new UL-DL configuration comprises:
receive an indication to switch to a dynamic reconfiguration mode and a timing to initiate the switch from the base station; and
receive the new UL-DL configuration for a subsequent radio frame.

20. The apparatus of claim 19, wherein the indication to switch to the dynamic reconfiguration mode and the timing to initiate the switch are received via one or more of Layer 1 (L1), Medium Access Control (MAC), or RRC signaling.

21. The apparatus of claim 18, wherein the switch out of the DRX mode comprises:
receive control information from the base station during a DRX active period.

22. The apparatus of claim 18, wherein the switch out of the DRX mode comprises:
determine that data is to be sent to the base station; and
transmit an indication to the base station that data is to be sent from the UE.

23. A computer program product, comprising a non-transitory computer-readable medium comprising:
instructions for causing a computer to receive, from a base station, a System Information Block (SIB) comprising a first uplink-downlink (UL-DL) configuration for TDD communication with the base station;
instructions for causing the computer to receive, from the base station, a Radio Resource Control (RRC) message comprising a second UL-DL configuration for TDD communication with the base station;
instructions for causing the computer to receive a reconfiguration message to change the first UL-DL configuration to the second UL-DL configuration;

instructions for causing the computer to switch to a discontinuous reception (DRX) mode;

instructions for causing the computer to monitor control information from the base station during DRX on periods, wherein a frequency of the DRX on periods is based on a reference TDD UL-DL configuration, and wherein the frequency of the DRX on periods is irrespective of the second UL-DL configuration; and instructions for causing the computer to change back to the first UL-DL configuration while switched to the DRX mode, the first UL-DL configuration being an initial UL-DL configuration.

24. The computer program product of claim 23, wherein the computer-readable medium further comprises:

instructions for causing the computer to switch out of the DRX mode; and instructions for causing the computer to determine a new UL-DL configuration to be used for communications with the base station.

25. The computer program product of claim 24, wherein the computer-readable medium further comprises:

instructions for causing the computer to receive an indication to switch to a dynamic reconfiguration mode and a timing to initiate the switch from the base station; and instructions for causing the computer to receive the new UL-DL configuration for a subsequent radio frames.

26. The computer program product of claim 25, wherein the indication to switch to the dynamic reconfiguration mode and the timing to initiate the switch are received via one or more of Layer 1 (L1), Medium Access Control (MAC), or RRC signaling.

\* \* \* \* \*

UNITED STATES PATENT AND TRADEMARK OFFICE
CERTIFICATE OF CORRECTION

| | | |
|---|---|---|
| PATENT NO. | : 11,337,245 B2 | Page 1 of 1 |
| APPLICATION NO. | : 14/654660 | |
| DATED | : May 17, 2022 | |
| INVENTOR(S) | : Wei et al. | |

It is certified that error appears in the above-identified patent and that said Letters Patent is hereby corrected as shown below:

On the Title Page

Item (71) Applicant should read:
QUALCOMM Incorporated, San Diego, CA (US)

Signed and Sealed this
Twenty-ninth Day of November, 2022

Katherine Kelly Vidal
*Director of the United States Patent and Trademark Office*